(12) United States Patent
Nam et al.

(10) Patent No.: US 11,765,669 B2
(45) Date of Patent: Sep. 19, 2023

(54) NETWORK ASSISTED ENVIRONMENTAL SENSING

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Junyi Li, Franklin Park, NJ (US); Peter Gaal, San Diego, CA (US); Sony Akkarakaran, Poway, CA (US); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/207,578

(22) Filed: Mar. 19, 2021

(65) Prior Publication Data

US 2022/0303917 A1 Sep. 22, 2022

(51) Int. Cl.
| | | |
|---|---|---|
| *H04W 52/36* | (2009.01) | |
| *H04W 4/38* | (2018.01) | |
| *H04W 72/12* | (2023.01) | |
| *H04L 5/00* | (2006.01) | |
| *H04B 7/0452* | (2017.01) | |
| *H04W 72/23* | (2023.01) | |

(52) U.S. Cl.
CPC ........ *H04W 52/367* (2013.01); *H04B 7/0452* (2013.01); *H04L 5/0051* (2013.01); *H04W 4/38* (2018.02); *H04W 72/23* (2023.01)

(58) Field of Classification Search
CPC ............. H04W 72/042; H04W 52/146; H04W 52/367; H04W 72/0446; H04W 76/27; H04W 24/00; H04W 24/04; H04W 24/08; H04W 24/10; H04W 28/04; H04W 48/08; H04W 48/16; H04W 52/0216; H04W 52/0219; H04W 52/143; H04W 52/228; H04W 52/242; H04W 52/286; H04W 52/325; H04W 52/346
USPC ................................ 455/69, 522, 507, 452.1
See application file for complete search history.

(56) References Cited

U.S. PATENT DOCUMENTS

| | | | | |
|---|---|---|---|---|
| 6,151,508 A | * | 11/2000 | Kim ...................... | H04W 52/12 455/69 |
| 2008/0293366 A1 | * | 11/2008 | Haartsen ............... | H04W 52/50 455/69 |
| 2009/0011770 A1 | * | 1/2009 | Jung ...................... | H04W 76/14 455/452.1 |

(Continued)

*Primary Examiner* — Tan H Trinh
(74) *Attorney, Agent, or Firm* — Loza & Loza, LLP

(57) ABSTRACT

Aspects relate to mechanisms for wireless communication devices to environmental sensing with the assistance of a network. A UE transmits an increase transmission power request message to a base station. The UE receives an increase transmission power acceptance message from the base station in response to transmitting the increase transmission power request message. The UE transmits a transmission using an increased transmission power for reflection by at least one object based on the increase transmission power acceptance message. The UE receives a reflection of the transmission reflected off the at least one object. The UE determines at least one parameter associated with the object based on the reflection of the transmission reflected off the at least one object.

29 Claims, 15 Drawing Sheets

(56) References Cited

U.S. PATENT DOCUMENTS

| | | | |
|---|---|---|---|
| 2011/0021223 A1* | 1/2011 | Hagerman | H04W 74/004 |
| | | | 455/507 |
| 2019/0254054 A1* | 8/2019 | Wang | H04L 5/0051 |
| 2019/0289570 A1* | 9/2019 | Kim | H04W 68/005 |
| 2020/0007288 A1* | 1/2020 | Manolakos | H04L 5/0051 |
| 2020/0015174 A1* | 1/2020 | Larson | H04B 17/309 |
| 2020/0145079 A1* | 5/2020 | Marinier | H04B 7/0695 |
| 2020/0153517 A1* | 5/2020 | Akkarakaran | H04B 17/104 |
| 2020/0288394 A1* | 9/2020 | Chhabra | H04W 52/241 |
| 2020/0367165 A1* | 11/2020 | Fernandes | H04W 52/287 |
| 2020/0404598 A1* | 12/2020 | Landis | H04W 52/146 |
| 2021/0076417 A1* | 3/2021 | Bayesteh | H04W 80/02 |

* cited by examiner

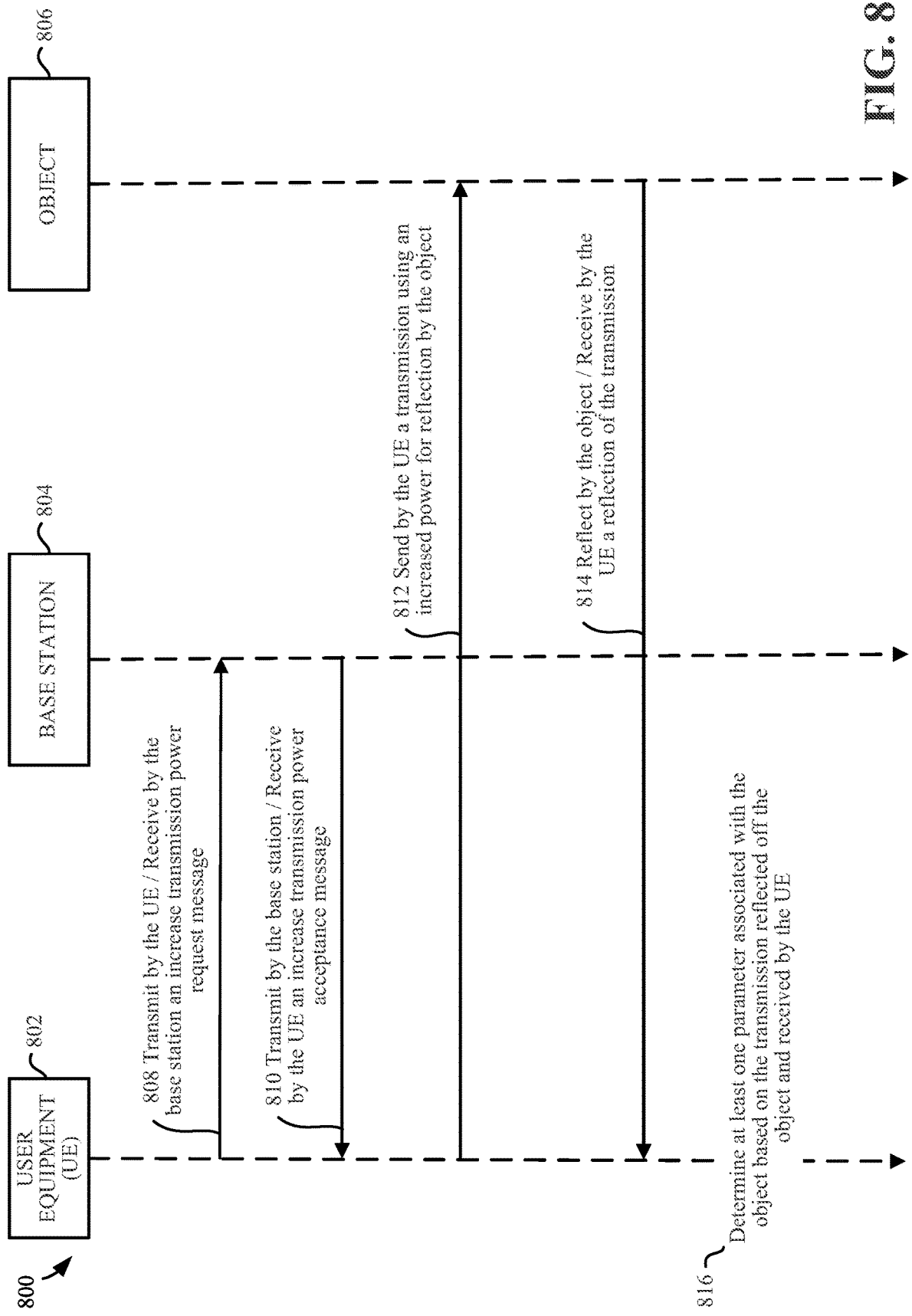

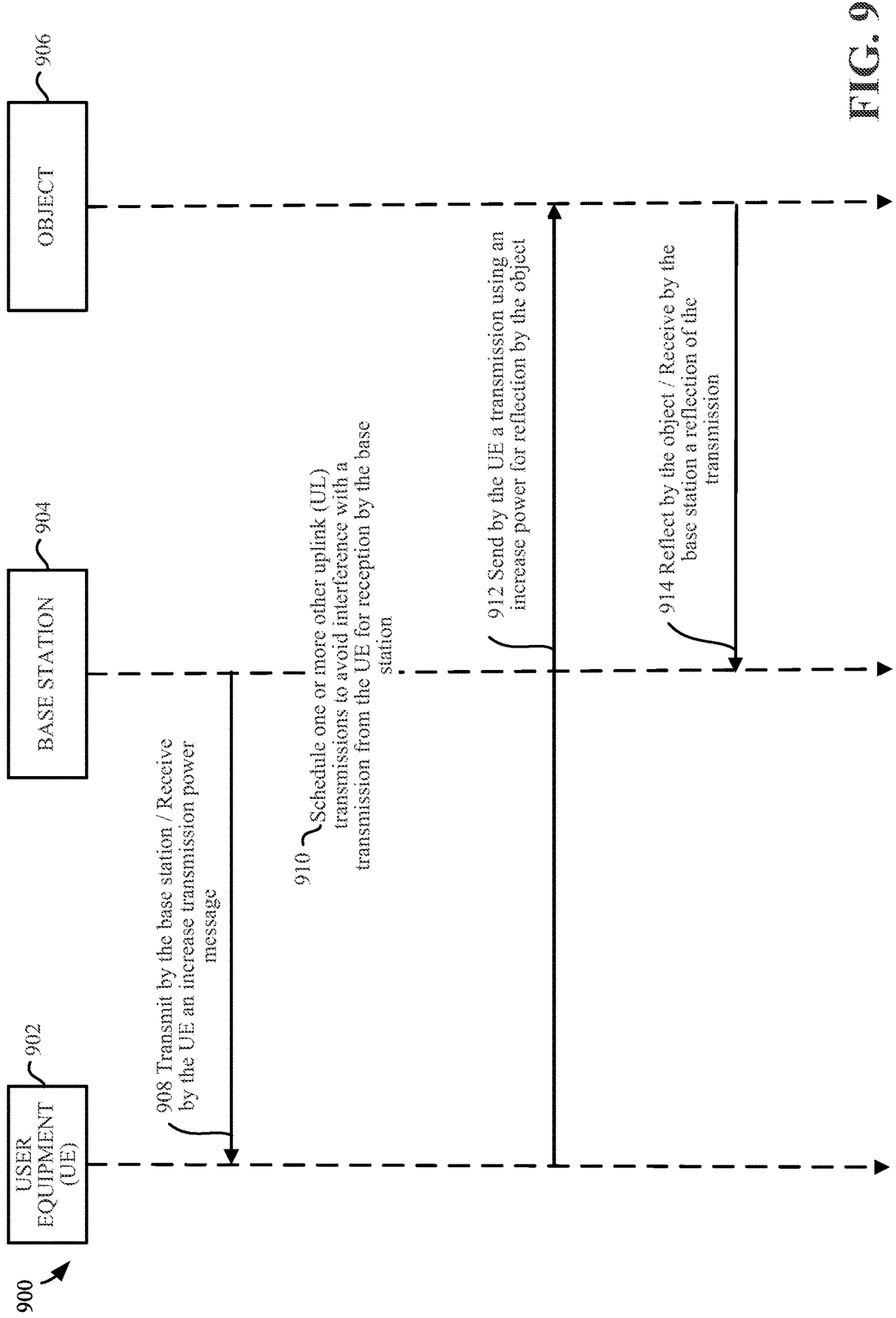

NETWORK ASSISTED ENVIRONMENTAL SENSING

TECHNICAL FIELD

The technology discussed below relates generally to wireless communication systems, and more particularly, to network assisted environmental sensing.

INTRODUCTION

Radio frequency (RF) sensing may be regarded as consumer-level radar with advanced detection capabilities. RF sensing may enable touchless interaction between a device and a system. RF sensing may use and reuse RF waveforms used for communication (e.g., 3GPP NR). These waveforms may include mmWave RF signals (e.g., 3GPP NR FR2/FR2x/FR4) for distance detection. RF sensing may be based on an NR interface for estimating range (e.g., distance), speed (e.g., doppler radar), and angles (e.g., angle of attack (AOA)) of objects.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method of wireless communication operable at a user equipment (UE) is provided. The method includes transmitting an increase transmission power request message to a base station. The method also includes receiving an increase transmission power acceptance message from the base station in response to transmitting the increase transmission power request message. The method further includes transmitting a transmission using an increased transmission power for reflection by at least one object based on the increase transmission power acceptance message. In addition, the method includes receiving a reflection of the transmission reflected off the at least one object. The method also includes determining at least one parameter associated with the object based on the reflection of the transmission reflected off the at least one object.

In some aspects, the at least one parameter may include at least one of a position of the at least one object, a velocity of the at least one object, a rotation of the at least one object, or a direction of movement of the at least one object. In some aspects, the transmission may include at least one of a null transmission or a data transmission. In some aspects, the transmission may include a sounding reference signal (SRS). In some aspects, the increase transmission power request message may include an aperiodic uplink (UL) transmission. In some aspects, the aperiodic UL transmission may include one of a dynamic grant (DG) PUSCH or an aperiodic sounding reference signal (A-SRS). In some aspects, the increase transmission power request message may include at least one of a UE assistance information feedback, a medium access control (MAC) control element (MAC-CE) or a scheduling request (SR) message. In some aspects, the increase transmission power acceptance message may include at least one of a scheduling downlink control information (DCI) message received via a physical downlink control channel (PDCCH), a MAC-CE message, or a radio resource control (RRC) signal. In some aspects, the increase transmission power may include a transmission power that is greater than a current transmission power control (TPC) state associated with the UE.

In some aspects, the increase transmission power request message may include an indication of a requested increase transmission power relative to a current transmission power control (TPC) state associated with the UE. In some aspects, the increase transmission power may include the expected increase transmission power. In some aspects, the expected increase transmission power may be based on a capability of the UE. In some aspects, the increase transmission power may include at least one of a maximum transmission power associated with the UE. In some aspects, the increase transmission power request message may include an indication of one or more directions for transmitting the transmission. In some aspects, the one or more directions may include a direction of a location of the at least one object. In some aspects, transmitting the transmission may include transmitting the transmission towards at least the direction of the location of the at least one object. In some aspects, the indication of the one or more directions may include a sound reference signal (SRS) resource indicator (SRI).

A method of wireless communication operable at a base station is provided. The method includes transmitting an increase transmission power message to a user equipment (UE) for the UE to transmit a transmission at an increased transmission power. The method also includes scheduling one or more other uplink (UL) transmissions to avoid interference with a transmission from the UE for reception by the base station. The method further includes receiving the transmission from the UE transmitted at the increased transmission power after the transmission is reflected off at least one object in response to transmitting the increase transmission power message.

In some aspects, the increase transmission power may include a transmission power that is greater than a current transmission power control (TPC) state associated with the UE. In some aspects, the increase transmission power may include of a maximum transmission power associated with the UE. In some aspects, the method may further include scheduling a large bandwidth (BW) for the transmission. In some aspects, the increase transmission power message may include an indication of the large BW for transmitting the transmission. In some aspects, the increase transmission power message may include an indication of a direction towards a location of the at least one object for transmission of the transmission. Additionally, or alternatively, the increase transmission power message may include an indication of a determined bandwidth of the transmission. For example, the increase transmission power message may include a bandwidth that is adequate for the transmission of the transmission. In some aspects, the one or more other UL transmissions may include at least one of a frequency division multiplexing (FDM) UL transmission or a multi-user, multiple-input, multiple-output (MU-MIMO) UL transmission. In some aspects, scheduling at least one of the frequency division multiplexing (FDM) uplink (UL) transmission or the multi-user, multiple-input, multiple-output (MU-MIMO) UL transmission to avoid the interference with the transmission may include receiving an indication of one or more UL transmissions for reception by one or more other base stations to avoid the interference with the transmission.

In some aspects, the transmission may include a beamformed transmission. In some aspects, the transmitting the increase transmission power message to the UE for the UE to transmit the transmission at the increase transmission power may include transmitting a direction for transmitting the beamformed transmission that coincides with a direction of the at least one object. In some aspects, the increased transmission power may include a transmission power that is greater than a current transmission power control (TPC) state associated with the UE. In some aspects, the increase transmission power may include a maximum transmission power associated with the UE. In some aspects, the interference may include at least one of co-channel interference (CCI) or cross-link interference (CLI). In some aspects, the transmitting the increase transmission power message to the UE for the UE to transmit the transmission at the increase transmission power may be based on a position of the UE relative to an edge of a cell associated with the base station. In some aspects, the increase transmission power message may include at least one of a scheduling downlink control information (DCI) message received via a physical downlink control channel (PDCCH), a MAC-CE message, or a radio resource control (RRC) signal. In some aspects, the increase transmission power message comprises a frequency for the UE to transmit the transmission. In some aspects, the transmitting the increase transmission power message to the UE for the UE to transmit the transmission at the increase transmission power may be based on a position of the UE and a position of one or more obstructions. In some aspects, the position of the one or more obstructions may include a position directly between the base station and the UE. In some aspects, the increase transmission power may include a power of the transmission that is above a threshold power during the reception of the transmission by the base station.

A user equipment (UE) in a wireless communication system is provided. The UE includes a wireless transceiver. The UE also includes a memory. The UE further includes a processor communicatively coupled to the wireless transceiver and the memory. The processor and the memory are configured to transmit an increase transmission power request message to a base station. The processor and the memory are also configured to receive an increase transmission power acceptance message from the base station in response to transmitting the increase transmission power request message. The processor and the memory are further configured to transmit a transmission using an increased transmission power for reflection by at least one object based on the increase transmission power acceptance message. In addition, the processor and the memory are configured to receive a reflection of the transmission reflected off the at least one object. The processor and the memory are also configured to determine at least one parameter associated with the object based on the reflection of the transmission reflected off the at least one object.

A base station in a wireless communication system is provided. The base station includes a wireless transceiver. The base station also includes a memory. The base station further includes a processor communicatively coupled to the wireless transceiver and the memory. The processor and the memory are configured to transmit an increase transmission power message to a user equipment (UE) for the UE to transmit a transmission at an increased transmission power. The processor and the memory are also configured to schedule one or more other uplink (UL) transmissions to avoid interference with a transmission from the UE for reception by the base station. The processor and the memory are further configured to receive the transmission from the UE transmitted at the increased transmission power after the transmission is reflected off at least one object in response to transmitting the increase transmission power message.

A non-transitory, processor-readable storage medium of a user equipment (UE) having instructions stored thereon is provided. The instructions, when executed by a processing circuit, cause the processing circuit to transmit an increase transmission power request message to a base station. The instructions, when executed by the processing circuit, also cause the processing circuit to receiving an increase transmission power acceptance message from the base station in response to transmitting the increase transmission power request message. The instructions, when executed by the processing circuit, further cause the processing circuit to transmit a transmission using an increased transmission power for reflection by at least one object based on the increase transmission power acceptance message. In addition, the instructions, when executed by the processing circuit, cause the processing circuit to receive a reflection of the transmission reflected off the at least one object. The instructions, when executed by the processing circuit, also cause the processing circuit to determining at least one parameter associated with the object based on the reflection of the transmission reflected off the at least one object.

A non-transitory, processor-readable storage medium of a base station having instructions stored thereon is provided. The instructions, when executed by a processing circuit, cause the processing circuit to transmit an increase transmission power message to a user equipment (UE) for the UE to transmit a transmission at an increased transmission power. The instructions, when executed by the processing circuit, also cause the processing circuit to schedule one or more other uplink (UL) transmissions to avoid interference with a transmission from the UE for reception by the base station. The instructions, when executed by the processing circuit, further cause the processing circuit to receive the transmission from the UE transmitted at the increased transmission power after the transmission is reflected off at least one object in response to transmitting the increase transmission power message.

A user equipment (UE) is provided. The UE includes a means for transmitting an increase transmission power request message to a base station. The UE also includes a means for receiving an increase transmission power acceptance message from the base station in response to transmitting the increase transmission power request message. The UE further includes a means for transmitting the transmission using an increased transmission power for reflection by at least one object based on the increase transmission power acceptance message. In addition, the UE includes a means for receiving a reflection of the transmission reflected off the at least one object. The UE also includes a means for determining at least one parameter associated with the object based on the reflection of the transmission reflected off the at least one object.

A base station is provided. The base station includes a means for transmitting an increase transmission power message to a user equipment (UE) for the UE to transmit a transmission at an increased transmission power. The base station also includes a means for scheduling one or more other uplink (UL) transmissions to avoid interference with a transmission from the UE for reception by the base station. The base station further includes a means for receiving the transmission from the UE transmitted at the increased transmission power after the transmission is reflected off at least one object in response to transmitting the increase transmission power message.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 is conceptual signaling diagram illustrating an example environment for network-assisted environmental sensing according to some aspects.

FIG. 9 is another conceptual signaling diagram illustrating an example environment for network-assisted environmental sensing according to some aspects.

DETAILED DESCRIPTION

Figure 1:
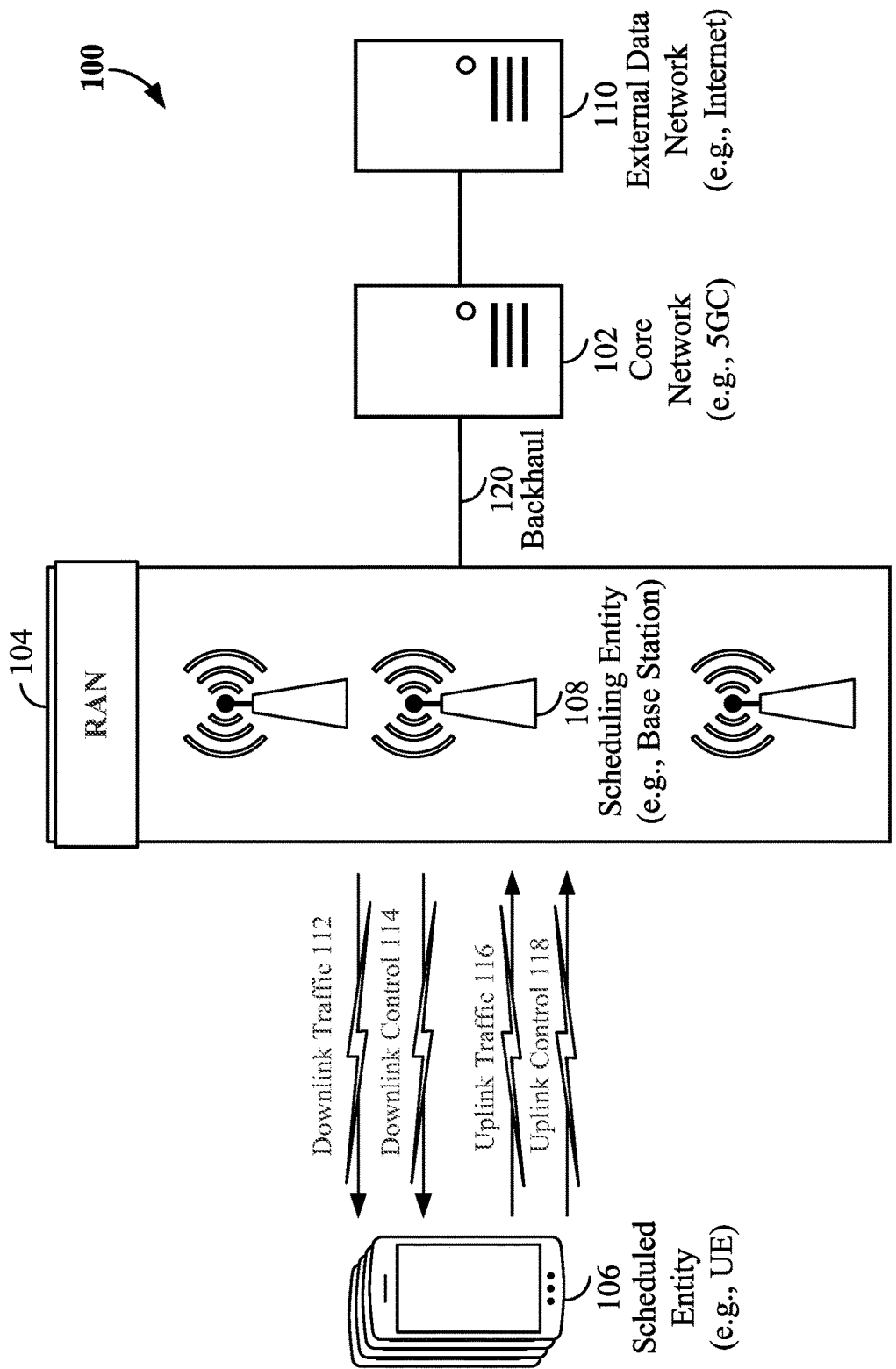
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). In some wireless communications systems, a UE may transmit and receive messages within a vehicle-to-everything (V2X) sidelink network. For example, one or more UEs may relay transmissions between each other while minimizing or reducing a number of uplink transmissions.

Radio frequency (RF) sensing may be regarded as consumer-level radar with advanced detection capabilities. RF sensing may enable touchless interaction between a device and a system. RF sensing may use and reuse RF waveforms used for communication (e.g., 3GPP NR). These waveforms may include millimeter wave (mmWave) RF signals (e.g., 3GPP NR FR2/FR2x/FR4) for distance detection. RF sensing may be based on an NR interface for estimating range (e.g., distance), speed (e.g., doppler radar), and angles (e.g., angle of attack (AOA)) of objects. In some aspects, mmWave may include frequency bands from 24 GHz to 100 GHz. In some aspects, additionally, or alternatively, mmWave may include frequency bands from 100 GHz to 300 GHz.

RF sensing may be used for health monitoring (e.g., monitoring a heartbeat detection device or a respiration rate monitoring device), gesture recognition (e.g., human activity recognition, keystroke detection, sign language recognition), contextual information acquisition (e.g., location detection/tracking, direction finding, range estimation), automotive radar (e.g., smart cruise control, collision avoidance), or the like. RF sensing may be based on an NR interface for estimating range (e.g., distance), speed (e.g., doppler radar), and angles (e.g., angle of attack (AOA)) of objects. Some specific reference signal (e.g., a sensing reference signal (RS)) may be required as an interrogation signal. A performance (e.g., a resolution and maximum values of range/velocity/angle) may depend on the RS design. In some aspects, environmental sensing may be implemented on the UE side using UL channels and/or signals. Unlike peer-assisted sensing, which assumes independent nodes with similar capabilities (e.g., sensing and assistant nodes), a base station may have more authority to control the procedure and resources for sensing. Types of sensing may include UL channels having wideband (WB) UL channels (e.g., a physical uplink shared channel (PUSCH) and sounding reference signal transmissions.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
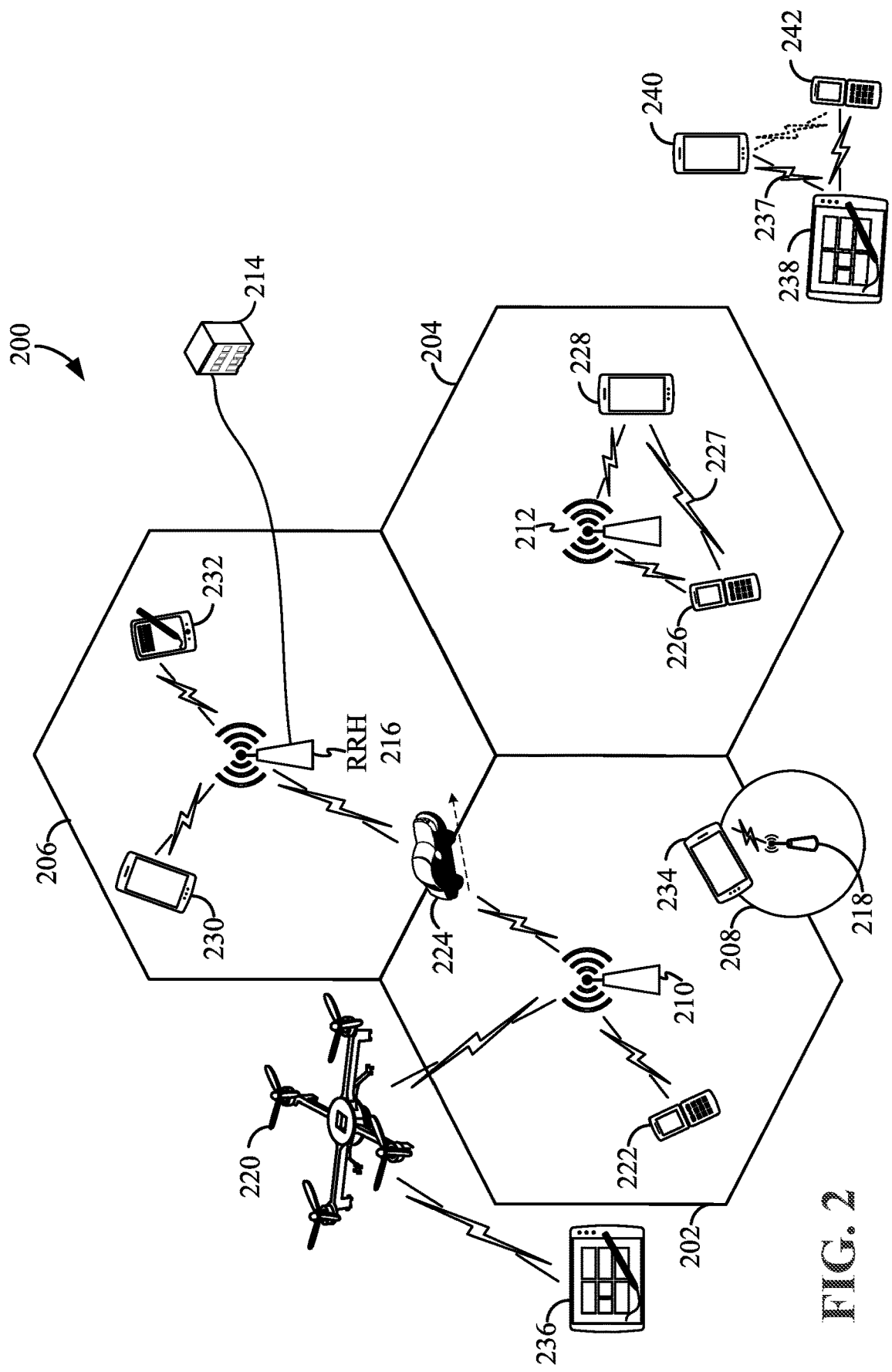
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204, 206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an AMF.

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
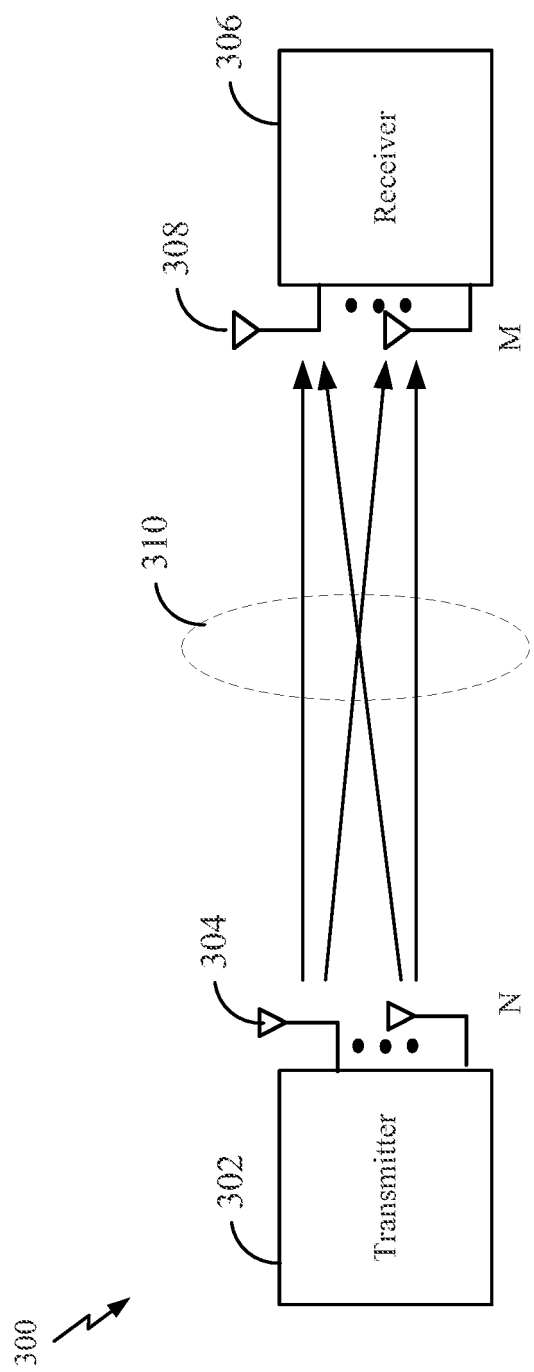
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel state information-reference signal (CSI-RS) with separate C-RS sequences for each layer to provide for multi-layer channel estimation. From the CSI-RS, the UE may measure the channel quality across layers and resource blocks and feedback a channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

Figure 4:
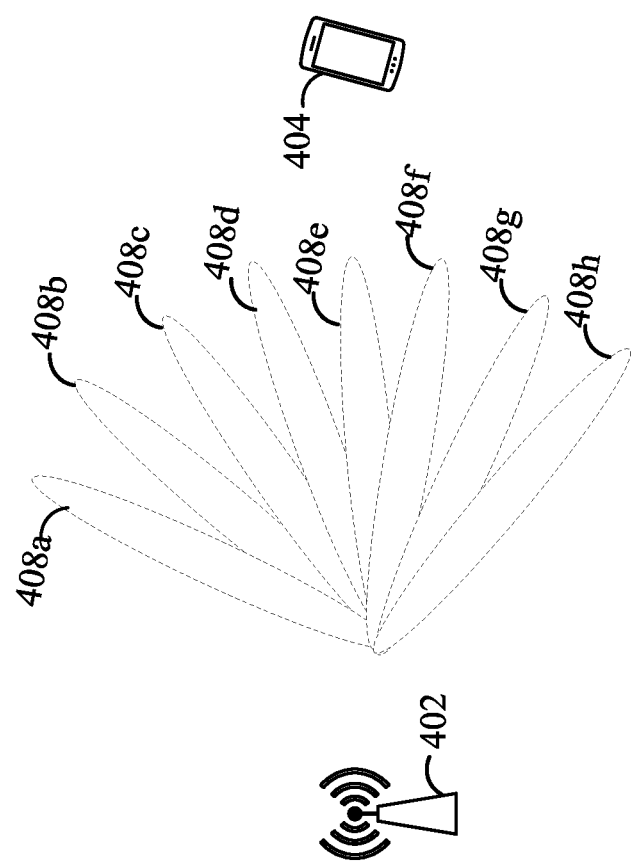
FIG. 4 is a diagram illustrating an example of communication between a base station and at least two user equipment (UEs) using beamforming according to some aspects.

FIG. 4 is a diagram illustrating communication between a radio access network (RAN) node 402, a first wireless communication device 404, and a second wireless communication device 406 using beamformed sidelink signals according to some aspects. Each of the RAN node 402 (e.g., a base station, such as a gNB) and the first wireless communication device 404 may be any of the receiving devices or transmitting devices illustrated in any of FIGS. 1-3. Each of the first wireless communication device 404 and the second wireless communication device 406 may be any of the UEs, V2X devices, transmitting devices or receiving devices illustrated in any of FIGS. 1-4.

In the example shown in FIG. 4, the radio access network (RAN) node 402 and the first wireless communication device 404 may be configured to communicate access (e.g., Uu) signals on one or more of a plurality of beams 408*a*, 408*b*, 408*c*, 408*d*, 408*e*, 408*f*, 408*g*, and 408*h*. Although the beams 408*a*, 408*b*, 408*c*, 408*d*, 408*e*, 408*f*, 408*g*, and 408*h* are illustrated in FIG. 4 as being generated on the RAN node 402, it should be understood that the same concepts described herein apply to beams generated on the first wireless communication device 404. For example, each of the RAN node 402 and the first wireless communication device 404 may select one or more beams to transmit access signals to the other communication device. In some examples, due to channel reciprocity, the selected beam(s) on each of the RAN node 402 and the first wireless communication device 404 may be used for both transmission and reception of access signals. It should be noted that while some beams are illustrated as adjacent to one another, such an arrangement may be different in different aspects. In some examples, the RAN node 402 and the first wireless communication device 404 may generate more or less beams distributed in different directions.

The number of beams on which a particular RAN node 402 or the first wireless communication device 404 may simultaneously communicate may be defined based on NR standards and specifications and capabilities of the RAN node 402 and the first wireless communication device 404. For example, the number of beams may be determined based on a number of antenna panels configured on the RAN node 402 or the first wireless communication device 404. Each beam may be utilized, for example, to transmit a respective layer for MIMO communication.

In some examples, to select one or more beams for communication on a access link between the RAN node 402 and the first wireless communication device 404, the RAN node 402 may transmit an access reference signal, such as an access synchronization signal block (SSB) or an access channel state information (CSI) reference signal (RS), on each of the plurality of beams 408*a*, 408*b*, 408*c*, 408*d*, 408*e*, 408*f*, 408*g*, and 408*h* in a beam-sweeping manner towards the first wireless communication device 404. The first wireless communication device 404 searches for and identifies the beams based on the beam reference signals. The first wireless communication device 404 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The first wireless communication device 404 may then transmit a beam measurement report to the RAN node 402 indicating the beam quality of one or more of the measured beams. The RAN node 402 may then select the particular beam(s) for communication between the RAN node 402 and the first wireless communication device 404 on the access link based on the beam measurement report. The RAN node 402 may then signal the selected beam(s) via, for example, a radio resource control (RRC) message or via a medium access control (MAC) control element (CE).

Each selected beam on one of the communication devices (e.g., the RAN node 402 or the first wireless communication device 404) may form a beam pair link (BPL) with a corresponding selected beam on the other communication device. Thus, each BPL includes corresponding transmit and receive beams on the RAN node 402 and the first wireless communication device 404. For example, a BPL may include a first transmit/receive beam on the RAN node 402 and a second transmit/receive beam on the first wireless communication device 404. To increase the data rate, multiple BPLs can be used to facilitate spatial multiplexing of multiple data streams. In some examples, the different BPLs can include beams from different antenna panels.

Various aspects of the present disclosure will be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
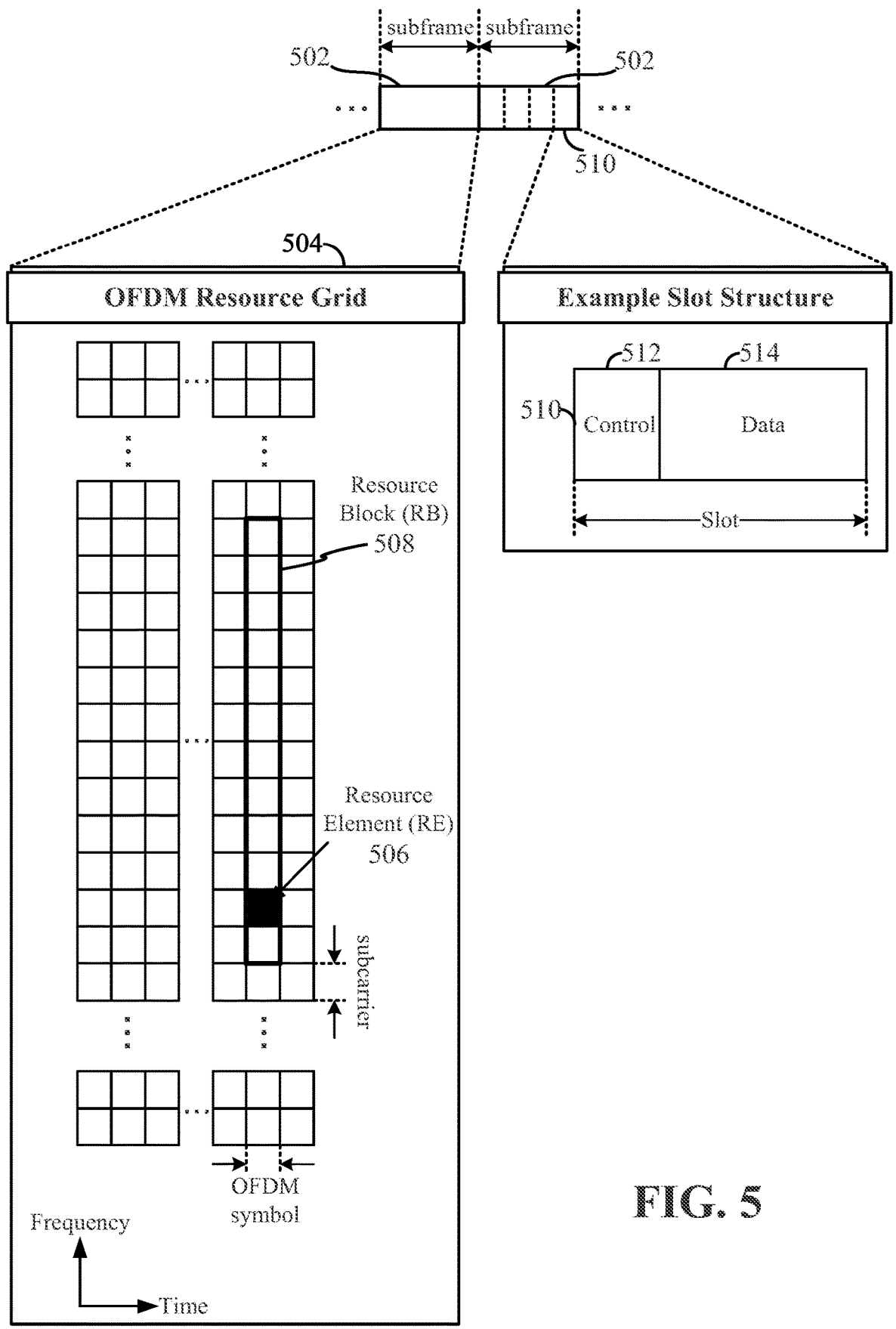
FIG. 5 is a schematic illustration of an organization of wireless resources in an air interface utilizing orthogonal frequency divisional multiplexing (OFDM) according to some aspects.

Referring now to FIG. 5, an expanded view of an exemplary subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 504 may be used to schematically represent time—frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 508 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (e.g., scheduled entities) for downlink or uplink transmissions typically involves scheduling one or more resource elements 506 within one or more sub-bands or BWPs. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast or unicast communication. For example, an omnidirectional or a non-beamformed, multicast, or groupcast communication may refer to a point-to-multipoint transmission by one device (e.g., a base station, UE, or other similar device) to other devices. Here, an omni-directional or a non-beamformed communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a proximity service (ProSe) PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
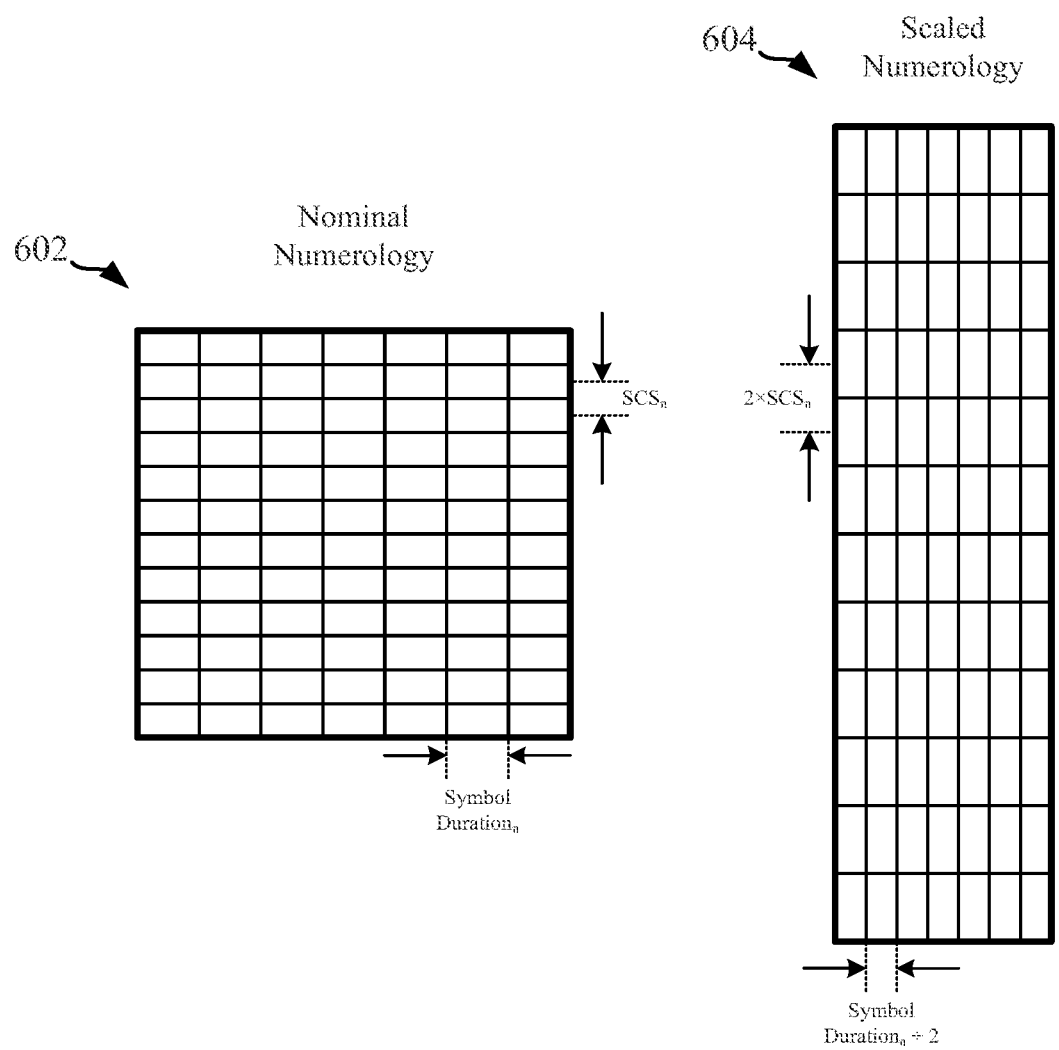
FIG. 6 is a schematic illustration of an OFDM air interface utilizing a scalable numerology according to some aspects.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 μs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 μs.

RF sensing may be used for health monitoring (e.g., monitoring a heartbeat detection device or a respiration rate monitoring device), gesture recognition (e.g., human activity recognition, keystroke detection, sign language recognition), contextual information acquisition (e.g., location detection/tracking, direction finding, range estimation), automotive radar (e.g., smart cruise control, collision avoidance), or the like. RF sensing may be based on an NR interface for estimating range (e.g., distance), speed (e.g., doppler radar), and angles (e.g., angle of attack (AOA)) of objects. Some specific reference signal (e.g., a sensing reference signal (RS)) may be required as an interrogation signal. A performance (e.g., a resolution and maximum values of range/velocity/angle) may depend on the RS design. In some aspects, environmental sensing may be implemented on the UE side using UL channels and/or signals. Unlike peer-assisted sensing, which assumes independent nodes with similar capabilities (e.g., sensing and assistant nodes), a base station may have more authority to control the procedure and resources for sensing. Types of sensing may include UL channels having wideband (WB) UL channels (e.g., a physical uplink shared channel (PUSCH) and sounding reference signal transmissions.

In some aspects, for example, with a monostatic radar system, a user equipment transmits an increase transmission power request message to a base station. In response, the base station transmits to the UE an increase transmission power acceptance message for increasing a transmission power of a transmission for sensing. The UE subsequently transmits a transmission using the increased transmission power. The transmission may be transmitted toward an object (e.g., a beamformed transmission) for reflection. The transmission is reflected off the object and received again by the UE. The UE determines one or more parameters associated with the object based on receive the reflection. In some aspects, the UE may determine at least one of a position of the object, a velocity of the object, a rotation of the least one object, or a direction of movement of the object based on the received transmission reflected off the object.

In some aspects, for example, with a bistatic radar system, a base station transmits an increase transmission power message to a UE instructing the UE to transmit a transmission using an increased power. The base station also schedules one or more other UL transmissions to avoid interference with a transmission from the UE transmitted at the increased power. The UE subsequent transmits a transmission using the increased transmission power. The transmission may be transmitted toward an object (e.g., a beamformed transmission) for reflection. The transmission is reflected off the object and received by the base station. The base station determines one or more parameters associated with the object based on receive the reflection. In some aspects, the base station may determine at least one of a position of the object, a velocity of the object, a rotation of the least one object, or a direction of movement of the object based on the received transmission reflected off the object. In some aspects, the base station may instruct the UE to reflect the transmission off the object at the increased transmission power to circumvent or bypass an obstruction blocking direct transmission between the UE and the base station.

Figure 7B:
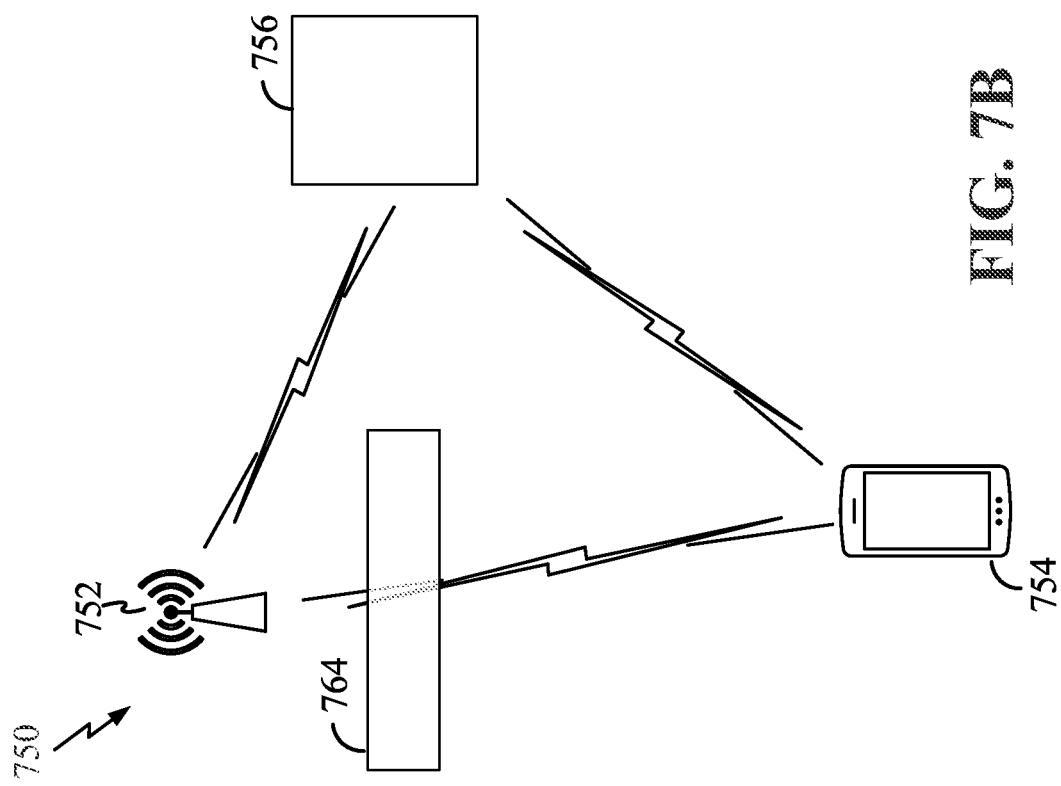
FIG. 7B is another conceptual diagram illustrating an example environment for network-assisted environmental sensing according to some aspects.
Figure 7A:
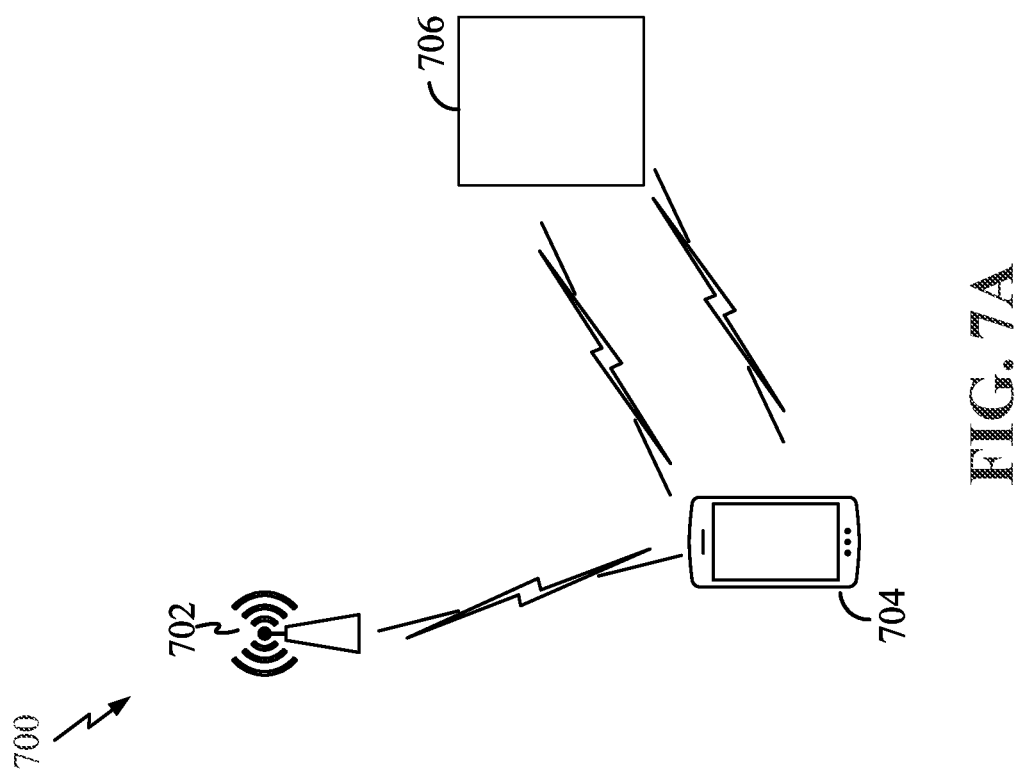
FIG. 7A is a conceptual diagram illustrating an example environment for network-assisted environmental sensing according to some aspects.

FIG. 7A is a conceptual diagram illustrating an example environment 700 for network-assisted environmental sensing according to some aspects. In some examples, the example environment 700 may be a monostatic radar system. As shown in FIG. 7A, the example environment 700 may include a base station 702, a UE 704, and an object 706. In some aspects, the object 706 may be within a distance of the UE 704 to allow the object 706 to receive a transmission from the UE 704 and reflect that transmission back to the UE 704. In some aspects, the object 706 may be located at a position that is within a distance of the UE 704 that the UE 704 is capable of reaching with a transmission, for example, at a maximum transmission power of the UE 704 or a transmission power specified by the base station 702 by which the UE 704 is permitted to send a transmission. In some aspects, the object 706 may be located about 1 inch, about 1 foot, about 10 feet, about 100 feet, about 500 feet, about 1000 feet, about 1 mile, about 10 miles, about 100 miles, about 1000 miles from the UE 704. The object 706 may be any object capable of reflecting a wireless transmission. In some aspects, the object 706 may be a heartbeat detection device, a respiration rate monitoring device, a human, a hand of a human, a fixed object (e.g., a statue, a building, a street sign), a moving device (e.g., an automobile, a motorcycle, an airplane), or the like. Each of the UE 704 and the base station 702 may correspond to any of the entities, gNodeBs, UEs, or the like as shown in FIGS. 1-4.

The UE 704 may transmit an increase transmission power request message to the base station 702. The increase transmission power request message may include a request for the base station 702 to permit the UE 704 to increase a transmission power of the UE 704. For example, the UE 704 may be configured to transmit transmissions at a transmission power associated with a first transmission power. In some aspects, the first transmission power may be associated with a current transmission power control (TPC) state of the UE 704. The UE 704 may transmit the increase power request message to the base station 702 to request an increase in transmission power for one or more subsequent transmissions. For example, the UE 704 may transmit an increase transmission power request message to the base station 702 to request that the first transmission power be increased to a second transmission power that is greater than the first transmission power. In some aspects, the second transmission power may be a maximum transmission power associated with the UE 704. For example, the maximum transmission power may be associated with a maximum transmission capability of the UE 704. In some aspects, the increase transmission power request message may include at least one of a UE assistance information feedback, a medium access control (MAC) control element (MAC-CE) or a scheduling request (SR) message. In some aspects, the increase transmission power request message may include an aperiodic uplink (UL) transmission. For example, the aperiodic UL transmission may include one of a dynamic grant (DG) PUSCH or an aperiodic sounding reference signal (A-SRS).

In some aspects, the increase transmission power request message may include a request for a transmission power increase sufficient to transmit an omni-directional or a non-beamformed transmission for reflection by an object that is within a distance of the UE 704 and receive that reflection of that broadcast transmission after the broadcast transmission is reflected off the object. For example, the UE 704 may determine a position of one or more different objects and select the object 706 that may be best suited for reflecting a signal or transmission. In some aspects, the positions of each of the one or more objects may be determined by stored geographical mappings of the one or more objects by the UE 704 and/or the base station 702. The best suited object may be an object that is within a maximum transmission distance of the UE 704, is the most likely to adequately reflect a transmission, is the closest to the UE 704, has the least amount of obstructions along a direct transmission path to the UE 704, a combination thereof, or the like. For example, the UE 704 may determine that the object 706 is within a distance of the UE 704. Based on the distance of the object from the UE 704, the UE 704 may transmit an increase transmission power request message to the base station 702 requesting that the UE 704 transmit an omni-directional or a non-beamformed transmission having a transmission power that is sufficient to be reflected off the object and received by the UE 704.

In some aspects, the increase transmission power request message may include a request for a transmission power increase sufficient to transmit a beamformed transmission towards an object that is within a distance of the UE 704 and receive a reflection of that beamformed transmission after the beamformed transmission is reflected off the object. For example, the UE 704 may determine a position of an object within a distance of the UE 704. Based on the distance of the object from the UE 704, the UE 704 may transmit an increase transmission power request message to the base station 702 requesting that the UE 704 transmit a beamformed transmission in a direction of the object having a transmission power that is sufficient to be reflected off the object and received by the UE 704. In some aspects, the direction of the object may be indicated in the increase transmission power request message using sounding reference signal (SRS) resource indicator (SRI).

In some aspects, the UE 704 may determine an amount of transmission power increase and an identified bandwidth of the UL transmission, and transmit an increase transmission power request message to the base station 702 including the UE-determined amount of transmission power increase and the identified bandwidth. For example, the UE 704 may determine a distance between the UE 704 and the object and an expected size of the object. Based on the distance between the UE 704 and the object and the size of the object, the UE 704 may transmit an increase transmission power request message to the base station 702 requesting that the UE 704 transmit an omni-directional or a non-beamformed transmission having a transmission power and a resolution that is sufficient to be reflected off the object and received by the UE 704.

In some aspects, the base station 702 may determine an amount of transmission power increase after receiving an increase transmission power request message from the UE 704. For example, after receiving an increase transmission power request message from the UE 704, the base station 702 may determine a position of the UE 704 and a position of one or more objects near the UE 704. After determining the position of the UE 704 and the one or more objects, the base station 702 may determine an amount of transmission power increase and a bandwidth for the UE 704 in response to receiving the increase transmission power request message from the UE 802.

The UE 704 may receive an increase transmission power acceptance message from the base station 702. For example, in response to transmitting an increase transmission power request message to the base station 702, the UE 704 may receive from the base station 702 an increase transmission power acceptance message granting the UE 704 permission to increase a transmission power of one or more subsequent transmissions. The increase transmission power acceptance message may indicate that the UE 704 is granted permission to transmit one or more subsequent transmissions at the second transmission power described herein. In some aspects, a set of PC loops and/or open-loop (OLPC) parameters may be provisioned for sensing UL transmissions. The increase transmission power acceptance message (e.g., included in scheduling downlink control information (DCI) over a PDCCH) may indicate the PC loop or OL PC index using SRI or an OLPC indication field. Additionally, or alternatively, the increase transmission power acceptance message may include a dedicated transmission such as at least one of a scheduling downlink control information (DCI) message received via a physical downlink control channel (PDCCH), a MAC-CE message, or a radio resource control (RRC) signal. In some aspects, when the increase transmission power request message includes a request for a specific transmission power increase, the increase transmission power acceptance message may include an indication of whether the base station 702 grants permission for the UE 704 to transmit one or more subsequent transmissions at the requested specific transmission power increase. In some aspects, when the increase transmission power request message includes a request for a specific transmission power increase, the increase transmission power acceptance message may include an indication of whether the base station 702 grants permission for the UE 704 to transmit one or more subsequent transmissions at the requested specific transmission power increase.

In some aspects, the increase transmission power acceptance message may include an acceptance by the base station 702 for the UE 704 to implement a transmission power increase sufficient to transmit a beamformed transmission towards an object that is within a distance of the UE 704 and receive a reflection of that beamformed transmission after the beamformed transmission is reflected off the object. For example, the UE 704 may determine a position of an object within a distance of the UE 704. Based on the distance of the object from the UE 704, the UE 704 may transmit an increase transmission power request message to the base station 702 requesting that the UE 704 transmit a beamformed transmission in a direction of the object having a transmission power that is sufficient to be reflected off the object and received by the UE 704. In response to receiving, the increase transmission power request message, the base station 702 may transmit an increase power transmission power acceptance message permitting the UE 704 to transmit a beamformed transmission at the requested increased transmission power and one or more direction including the direction of the object. In some aspects, the direction of the object may be indicated in the increase transmission power acceptance message using sounding reference signal (SRS) resource indicator (SRI).

The increase transmission power acceptance message may include a scheduling of the transmission at the increased transmission power. For example, the increase transmission power acceptance message may schedule one or more frequencies and/or one or more time slots for transmitting the transmission at the increase transmission power. The increase transmission power acceptance message may indicate one or more wideband (WB) uplink (UL) channels for the UE 704 to transmit the transmission. In some aspects, the one or more WB UL channels comprise a physical uplink shared channel (PUSCH). In some aspects, the increase transmission power acceptance message may indicate that the UE 704 is to transmit the transmission using a sounding reference signals (SRS). The base station 702 may schedule the transmission at the increased transmission power to avoid interference with one or more other transmissions associated with the base station 702.

Additionally, or alternatively, the base station 702 may schedule one or more other transmissions associated with the base station 702 to avoid interference with the transmission from the UE 704 at the increased transmission power. For example, after receiving an increase transmission power request message from the UE 704, the base station 702 may coordinate one or more other transmissions between the base station and one or more other UEs to avoid interference with the transmission from the UE 704 at the increased transmission power. During or after coordinating one or more other transmissions between the base station and one or more other UEs, the base station 702 may transmit an increase transmission power acceptance message for reception by the UE 704. In some aspects, the interference may include at least one of co-channel interference (CCI) or cross-link interference (CLI).

Additionally, or alternatively, the base station 702 may coordinate scheduling with one or more other base stations associated with one or more other cells adjacent to the cell associated with the base station and/or near a location of the UE 704 to avoid interference with the transmission from the UE 704 at the increased transmission power. For example, the base station 702 may determine whether the UE 704 is on an edge of a cell associated with the base station 702. The base station 702 may also identify one or more other base stations associated with one or more cells that are adjacent to the cell associated with the base station 702 and/or near the location of the UE 704. The base station 702 may receive an indication of one or more uplink transmissions associated with the one or more other base stations and coordinate those one or more uplink transmission with the transmission from the UE 704 at the increased transmission power to avoid interference. In some aspects, the one or more other UL transmissions may include at least one of a frequency division multiplexing (FDM) UL transmission or a multi-user, multiple-input, multiple-output (MU-MIMO) UL transmission. In some aspects, the interference may include at least one of co-channel interference (CCI) or cross-link interference (CLI).

Alternatively, in response to transmitting an increase transmission power request message to the base station 702, the UE 704 may receive from the base station 702 an increase transmission power rejection message preventing the UE 704 from increasing a transmission power of one or more subsequent transmissions. For example, due to a lack of transmission scheduling availability within a cell or one or more adjacent cells and/or the potential for interference with one or more other transmission within the cell or one or more adjacent cells, the base station 702 may determine that the UE 704 is not permitted to increase a transmission power of one or more subsequent transmissions. In some aspects, when the increase transmission power request message includes a request for a specific transmission power increase, the increase transmission power acceptance message may include an indication that the base station 702 grants permission for the UE 704 to transmit one or more subsequent transmissions according to a different specific transmission power increase rather than the requested specific transmission power increase. For example, due to the potential for interference with one or more other transmission within the cell or one or more adjacent cells, the base station 702 may determine that the UE 704 is permitted to transmit one or more subsequent transmissions according to a different specific transmission power increase rather than the requested specific transmission power increase.

The UE 704 may send a transmission using an increased power. The UE 704 may send a transmission using an increased power for reflection by the object 706. In some aspects, the transmission may include at least one of a null transmission or a data transmission. For example, the transmission may be a null transmission used for reflection off the object and subsequent reception of the reflection of the transmission by the UE 704. The null transmission may be used when the transmission is scheduled during a time period coordinated by the base station 702 to avoid interference. Because the null transmission is transmitted at a time to avoid interference, the UE 704 may receive the reflection of the null transmission and determine that the UE 704 transmitted the null transmission because no other null transmissions are transmitted at the same or concurrent time as the null transmission. As another example, the transmission may be a data transmission used for reflection off the object and subsequent reception of the reflection of the transmission by the UE 704. The data transmission may be used so that when the UE 704 receives the reflection of the transmission, the UE 704 may be able to determine that the reflection is a reflection of the transmission transmitted by the UE 704 and not a different transmission.

In some aspects, the transmission may include one or more wideband (WB) uplink (UL) channels, and, in some aspects, the one or more WB UL channels may include a physical uplink shared channel (PUSCH). In some aspects, the transmission may include a sounding reference signal (SRS). In some aspects, the increase transmission power may include a transmission power that is greater than a current transmission power control (TPC) state associated with the UE. In some aspects, the increase transmission power request message may include an indication of a requested increase transmission power relative to a current transmission power control (TPC) state associated with the UE. For example, the increase transmission power may include the requested increase transmission power and the requested increase transmission power may be based on a capability of the UE. In some aspects, the increase transmission power may include a maximum transmission power associated with the UE.

In some aspects, the transmission may be transmitted by the UE 704 in a direction associated with the object. For example, the UE 704 may determine a position of an object within a distance of the UE 704. Based on the distance of the object from the UE 704, the UE 704 may transmit an increase transmission power request message to the base station 702 requesting that the UE 704 send a beamformed transmission in a direction of the object having a transmission power that is sufficient to be reflected off the object and received by the UE 704. In response to receiving the increase transmission power request message, the base station 702 may transmit an increase power transmission power acceptance message permitting the UE 704 to send a beamformed transmission at the requested increased transmission power and one or more direction including the direction of the object. In some aspects, the direction of the object may be indicated in the increase transmission power acceptance message using sounding reference signal (SRS) resource indicator (SRI). Based on receiving the increase power transmission power acceptance message and indicating the direction of the object, the UE 704 may transmit a beamformed transmission at the increased power.

The UE 704 may receive a reflection of the transmission reflected off the object 706. The UE 704 may determine at least one parameter associated with the object 706 based on the reflection of the transmission reflected off the object 706. In some aspects, the UE 704 may determine at least one of a position of the object 706, a velocity of the object 706, a rotation of the object 706, or a direction of movement of the object 706 based on the received increase power transmission reflected off the object 706.

FIG. 7B is another conceptual diagram illustrating an example environment 750 for network-assisted environmental sensing according to some aspects. In some examples, the example environment 750 may be a bistatic radar system. The example environment 750 may also include an object 756 that may be within a distance of the UE 754. In some aspects, the object 756 may be within a distance of the UE 754 to allow the object 756 to receive a transmission from the UE 754 and reflect that transmission to the base station 752. In some aspects, the object 756 may be located at a position that is not along a direct path (e.g., offset from a direct path) between the UE 754 and the base station 752. For example, the object 756 may be about 1 inch, about 1 foot, about 10 feet, about 100 feet, about 500 feet, about 1000 feet, about 1 mile, about 10 miles, about 100 miles, or about 1000 miles from a direct path between the UE 754 and the base station 752. In some aspects, the object 756 may be located at a position that is within a distance of the UE 754 that the UE 752 is capable of reaching with a transmission, for example, at a maximum transmission power of the UE 752 or a transmission power specified by the base station 754 by which the UE 752 is permitted to send a transmission. The object 756 may be any object capable of reflecting a wireless transmission. In some aspects, the object 756 may be a heartbeat detection device, a respiration rate monitoring device, a human, a hand of a human, a fixed object (e.g., a statue, a building, a street sign), a moving device (e.g., an automobile, a motorcycle, an airplane), or the like. In some aspects, the example environment 750 may also include an obstruction 764. The base station 752 may instruction the UE 754 to reflect a transmission of the object 756 and toward to the base station 752 to receive the transmission while bypassing the obstruction 764. Each of the UE 754 and the base station 752 may correspond to any of the entities, gNodeBs, UEs, or the like as shown in FIGS. 1-4 and 7A. In some aspects, the object 756 may correspond to the object described in FIG. 7A.

The base station 752 may transmit an increase transmission power message to the UE 754. For example, the UE 754 may be configured to transmit transmissions at a transmission power associated with a first transmission power. In some aspects, the first transmission power may be associated with a current transmission power control (TPC) state of the UE 754. The UE 754 may receive the increase power message from the base station 752 to increase a transmission power for one or more subsequent transmissions. For example, the UE 754 may receive an increase transmission power message from the base station 752 instructing the UE 754 to increase the transmission power from the first transmission power to a second transmission power that is greater than the first transmission power. In some aspects, the second transmission power may be a maximum transmission power associated with the UE 754. For example, the maximum transmission power may be associated with a maximum transmission capability of the UE 754.

In some aspects, the increase transmission power message may include a request for a transmission power increase sufficient for the UE 754 to transmit an omni-directional or a non-beamformed transmission for reflection by an object that is within a distance of the UE 754 towards the base station 752. For example, the base station 752 and/or the UE 754 may determine a position of one or more different objects and select the object 756 that may be best suited for reflecting a signal or transmission. In some aspects, the positions of each of the one or more objects may be determined by stored geographical mappings of the one or more objects by the base station 752 and/or the UE 754. The best suited object may be an object that is within a maximum transmission distance of the UE 754, is the most likely to adequately reflect a transmission, is the closest to the UE 754, has the least amount of obstructions along a direct transmission path to the UE 754, has the least amount of obstructions along a direct transmission path to the base station 752, a combination thereof, or the like. For example, the UE 754 may determine that the object 756 is within a distance of the UE 754. Based on the distance of the object from the UE 802, the base station 752 may transmit an increase transmission power message to the UE 754 requesting that the UE 754 transmit an omni-directional or a non-beamformed transmission having a transmission power that is sufficient to be reflected off the object and towards the base station 752.

In some aspects, the increase transmission power message may include an indication for the UE 754 to increase a transmission power sufficient to transmit a beamformed transmission towards an object that is within a distance of the UE 754 for reflection of that beamformed transmission off the object and towards the base station 752. For example, the base station 752 and/or the UE 754 may determine a position of an object within a distance of the UE 754. Based on the distance of the object from the UE 754, the base station 752 may transmit an increase transmission power message to the UE 754 instructing the UE 754 to transmit a beamformed transmission in a direction of the object having a transmission power that is sufficient to be reflected off the object and towards the base station 752 for reception by the base station 752. In some aspects, the direction of the object may be indicated in the increase transmission power message using sounding reference signal (SRS) resource indicator (SRI).

In some aspects, the UE 754 may determine an amount of transmission power increase after receiving an increase transmission power message from the base station 752. For example, the base station 752 and/or the UE 754 may determine a distance between the UE 754 and the object. Based on the distance between the UE 754 and the object, the UE 754 may receive an increase transmission power message from the base station 752 and transmit an omni-directional or a non-beamformed transmission having a transmission power that is sufficient to be reflected off the object and received by the base station.

In some aspects, the base station 752 may determine an amount of transmission power increase. For example, the base station 752 may determine a position of the UE 754 and a position of one or more objects near the UE 754. After determining the position of the UE 754 and the object, the base station 752 may determine an amount of transmission power increase for the UE 802 and include the amount of transmission power increase in the increase transmission power message for transmission to the UE 754.

In some aspects, the UE 754 may receive an increase transmission power message from the base station 752 instructing the UE 754 to increase a transmission power of one or more subsequent transmissions. The increase transmission power message may indicate that the UE 754 is instructed to transmit one or more subsequent transmissions at the second transmission power described herein. In some aspects, a set of PC loops and/or open-loop (OLPC) parameters may be provisioned for sensing UL transmissions. The increase transmission power message (e.g., included in scheduling downlink control information (DCI) over a PDCCH) may indicate the PC loop or OL PC index using SRI or an OLPC indication field. Additionally, or alternatively, the increase transmission power message may include a dedicated transmission such as at least one of a scheduling downlink control information (DCI) message received via a physical downlink control channel (PDCCH), a MAC-CE message, or a radio resource control (RRC) signal.

In some aspects, the increase transmission power message may include an instruction by the base station 752 for the UE 754 to implement a transmission power increase sufficient to transmit a beamformed transmission towards an object that is within a distance of the UE 754 and so that the base station 752 receives a reflection of that beamformed transmission after the beamformed transmission is reflected off the object. For example, the base station 752 and/or the UE 754 may determine a position of an object within a distance of the UE 754. Based on the distance of the object from the UE 754, the UE 754 may receive an increase transmission power message from the base station 752 instructing the UE 754 transmit a beamformed transmission in a direction of the object having a transmission power that is sufficient to be reflected off the object and received by the base station 752. In some aspects, the direction of the object may be indicated in the increase transmission power acceptance message using sounding reference signal (SRS) resource indicator (SRI).

The increase transmission power acceptance message may include a scheduling of the transmission at the increased transmission power. For example, the increase transmission power acceptance message may schedule one or more frequencies and/or one or more time slots for transmitting the transmission at the increase transmission power. The increase transmission power acceptance message may indicate one or more wideband (WB) uplink (UL) channels for the UE 754 to transmit the transmission. In some aspects, the one or more WB UL channels comprise a physical uplink shared channel (PUSCH). In some aspects, the increase transmission power acceptance message may indicate that the UE 754 is to transmit the transmission using a sounding reference signals (SRS). The base station 752 may schedule the transmission at the increased transmission power to avoid interference with one or more other transmissions associated with the base station 752.

The base station 752 may schedule one or more other uplink (UL) transmissions to avoid interference with a transmission from the UE 754 for reception by the base station 752. For example, before, during, or after transmitting an increase transmission power message to the UE 754, the base station 752 may coordinate one or more other transmissions between the base station and one or more other UEs to avoid interference with the transmission from the UE 754 at the increased transmission power. In some aspects, the interference may include at least one of co-channel interference (CCI) or cross-link interference (CLI).

Additionally, or alternatively, the base station 804 may coordinate scheduling with one or more other base stations associated with one or more other cells adjacent to the cell associated with the base station and/or near a location of the UE 754 to avoid interference with the transmission from the UE 754 at the increased transmission power. For example, the base station 752 may determine whether the UE 754 is on an edge of a cell associated with the base station 752. The base station 752 may also identify one or more other base stations associated with one or more cells that are adjacent to the cell associated with the base station 752 and/or near the location of the UE 754. The base station 752 may receive an indication of one or more uplink transmissions associated with the one or more other base stations and coordinate those one or more uplink transmission with the transmission from the UE 754 at the increased transmission power to avoid interference. In some aspects, the one or more other UL transmissions may include at least one of a frequency division multiplexing (FDM) UL transmission or a multi-user, multiple-input, multiple-output (MU-MIMO) UL transmission. In some aspects, the interference may include at least one of co-channel interference (CCI) or cross-link interference (CLI).

The UE 754 may send (e.g., transmit) a transmission (e.g., data, a data packet, a data message, a message, a control message) using an increased power. In some aspects, the UE 754 may send the transmission using the increased power for reflection by the object 756. The UE 754 may send a transmission using an increased power for reflection by the object 756. In some aspects, the transmission may include at least one of a null transmission or a data transmission. For example, the transmission may be a null transmission used for reflection off the object and subsequent reception of the reflection of the transmission by the base station 752. The null transmission may be used when the transmission is scheduled during a time period coordinated by the base station 752 to avoid interference. Because the null transmission is transmitted at a time to avoid interference, the base station 752 may receive the reflection of the null transmission and determine that the UE 754 transmitted the null transmission because no other null transmissions are transmitted at the same or concurrent time as the null transmission. As another example, the transmission may be a data transmission used for reflection off the object and subsequent reception of the reflection of the transmission by the base station 752. The data transmission may be used so that when the base station 752 receives the reflection of the transmission, the base station 752 may be able to determine that the reflection is a reflection of the transmission transmitted by the UE 754 and not a different transmission.

In some aspects, the transmission may include one or more wideband (WB) uplink (UL) channels, and, in some aspects, the one or more WB UL channels may include a physical uplink shared channel (PUSCH). In some aspects, the transmission may include a sounding reference signal (SRS). In some aspects, the increase transmission power may include a transmission power that is greater than a current transmission power control (TPC) state associated with the UE. In some aspects, the increase transmission power request message may include an indication of an increase transmission power relative to a current transmission power control (TPC) state associated with the UE. For example, the increase transmission power may include an increase transmission power based on a capability of the UE. In some aspects, the increase transmission power may include a maximum transmission power associated with the UE.

In some aspects, the transmission may be transmitted by the UE 754 in a direction associated with the object. For example, the base station 752 and/or the UE 754 may determine a position of an object within a distance of the UE 754. Based on the distance of the object from the UE 754, the UE 754 may send a beamformed transmission in a direction of the object having a transmission power that is sufficient to be reflected off the object and received by the base station 752. The base station 752 may transmit an increase power transmission power message instructing the UE 754 to send a beamformed transmission at the instructed increased transmission power and one or more direction including the direction of the object. In some aspects, the direction of the object may be indicated in the increase transmission power message using sounding reference signal (SRS) resource indicator (SRI). Based on receiving the increase power transmission power message and indicating the direction of the object, the UE 754 may send a beamformed transmission at the increased power for reflection at the object and subsequent reception by the base station 752.

The base station 752 may receive a reflection of the transmission transmitted using the increased power after the transmission is reflected off the object 756. In some aspects, the base station 752 may receive a reflection of the transmission transmitted using the increased power after the transmission is reflected off the object 756 in response to the base station 752 transmitting the increase transmission power message. In some aspects, the base station 752 may determine at least one parameter associated with the object 756 based on the reflection of the transmission reflected off the object 756. In some aspects, the base station 752 may determine at least one of a position of the object 756, a velocity of the object 756, a rotation of the object 756, or a direction of movement of the object 756 based on the received increase power transmission reflected off the object 906. In some aspects, for example, when the transmission is a data transmission, the base station 752 may use the object 756 to reflect a transmission from the UE 754 and go around an obstruction 764 blocking direct communication between the UE 754 and the base station 752.

FIG. 8 is conceptual signaling diagram illustrating an example environment 800 for network-assisted environmental sensing according to some aspects. In the example shown in FIG. 8, a user equipment (UE) 802 is in wireless communication with a base station 804 over one or more wireless communication links. The example environment 800 may also include an object 806 that may be within a distance of the UE 802. In some aspects, the object 806 may be within a distance of the UE 802 to allow the object 806 to receive a transmission from the UE 802 and reflect that transmission back to the UE 802. In some aspects, the object 806 may be located at a position that is within a distance of the UE 802 that the UE 802 is capable of reaching with a transmission, for example, at a maximum transmission power of the UE 802 or a transmission power specified by the base station 804 by which the UE 802 is permitted to send a transmission. In some aspects, the object 706 may be located about 1 inch, about 1 foot, about 10 feet, about 100 feet, about 500 feet, about 1000 feet, about 1 mile, about 10 miles, about 100 miles, or about 1000 miles from the UE 704. The object 806 may be any object capable of reflecting a wireless transmission. In some aspects, the object 806 may be a heartbeat detection device, a respiration rate monitoring device, a human, a hand of a human, a fixed object (e.g., a statue, a building, a street sign), a moving device (e.g., an automobile, a motorcycle, an airplane), or the like. In some aspects, the example environment 800 may include one or more aspects of a monostatic radar system such as the example environment 700 illustrated in FIG. 7A. Each of the UE 802 and the base station 804 may correspond to any of the entities, gNodeBs, UEs, or the like as shown in FIGS. 1-4, 7A, and 7B. In some aspects, the object 906 may correspond to any of the objects described in FIGS. 7A and 7B.

At 808, the UE 802 may transmit an increase transmission power request message to the base station 804. The increase transmission power request message may include a request for the base station 804 to permit the UE 802 to increase a transmission power of the UE 802. For example, the UE 802 may be configured to transmit transmissions at a transmission power associated with a first transmission power. In some aspects, the first transmission power may be associated with a current transmission power control (TPC) state of the UE 802. The UE 802 may transmit the increase power request message to the base station 804 to request an increase in transmission power for one or more subsequent transmissions. For example, the UE 802 may transmit an increase transmission power request message to the base station 804 to request that the first transmission power be increased to a second transmission power that is greater than the first transmission power. In some aspects, the second transmission power may be a maximum transmission power associated with the UE 802. For example, the maximum transmission power may be associated with a maximum transmission capability of the UE 802. In some aspects, the increase transmission power request message may include at least one of a UE assistance information feedback, a medium access control (MAC) control element (MAC-CE) or a scheduling request (SR) message. In some aspects, the increase transmission power request message may include an aperiodic uplink (UL) transmission. For example, the aperiodic UL transmission may include one of a dynamic grant (DG) PUSCH or an aperiodic sounding reference signal (A-SRS).

In some aspects, the increase transmission power request message may include a request for a transmission power increase sufficient to transmit an omni-directional or a non-beamformed transmission for reflection by an object that is within a distance of the UE 802 and receive that reflection of that broadcast transmission after the broadcast transmission is reflected off the object. For example, the UE 802 may determine a position of one or more different objects and select the object that may be best suited for reflecting a signal or transmission. In some aspects, the positions of each of the one or more objects may be determined by stored geographical mappings of the one or more objects by the UE 802 and/or the base station 804. The best suited object may be an object that is within a maximum transmission distance of the UE 802, is the most likely to adequately reflect a transmission, is the closest to the UE 802, has the least amount of obstructions along a direct transmission path to the UE 802, a combination thereof, or the like. For example, the UE 802 may determine that the object is within a distance of the UE 804. Based on the distance of the object from the UE 802, the UE 802 may transmit an increase transmission power request message to the base station 804 requesting that the UE 802 transmit an omni-directional or a non-beamformed transmission having a transmission power that is sufficient to be reflected off the object and received by the UE 802.

In some aspects, the increase transmission power request message may include a request for a transmission power increase sufficient to transmit a beamformed transmission towards an object that is within a distance of the UE 802 and receive a reflection of that beamformed transmission after the beamformed transmission is reflected off the object. For example, the UE 802 may determine a position of an object within a distance of the UE 802. Based on the distance of the object from the UE 802, the UE 802 may transmit an increase transmission power request message to the base station 804 requesting that the UE 802 transmit a beamformed transmission in a direction of the object having a transmission power that is sufficient to be reflected off the object and received by the UE 802. In some aspects, the direction of the object may be indicated in the increase transmission power request message using sounding reference signal (SRS) resource indicator (SRI).

In some aspects, the UE 802 may determine an amount of transmission power increase and transmit an increase transmission power request message to the base station 804 including the UE-determined amount of transmission power increase. For example, the UE 802 may determine a distance between the UE 802 and the object. Based on the distance between the UE 802 and the object, the UE 802 may transmit an increase transmission power request message to the base station 804 requesting that the UE 802 transmit an omni-directional or a non-beamformed transmission having a transmission power that is sufficient to be reflected off the object and received by the UE 802.

In some aspects, the base station 804 may determine an amount of transmission power increase after receiving an increase transmission power request message from the UE 802. For example, after receiving an increase transmission power request message from the UE 802, the base station 804 may determine a position of the UE 802 and a position of one or more objects near the UE 802. After determining the position of the UE 802 and the one or more objects, the base station 804 may determine an amount of transmission power increase for the UE 802 in response to receiving the increase transmission power request message from the UE 802.

At 810, the UE 802 may receive an increase transmission power acceptance message from the base station 804. For example, in response to transmitting an increase transmission power request message to the base station 804, the UE 802 may receive from the base station 804 an increase transmission power acceptance message granting the UE 802 permission to increase a transmission power of one or more subsequent transmissions. The increase transmission power acceptance message may indicate that the UE 802 is granted permission to transmit one or more subsequent transmissions at the second transmission power described herein. In some aspects, a set of PC loops and/or open-loop (OLPC) parameters may be provisioned for sensing UL transmissions. The increase transmission power acceptance message (e.g., included in scheduling downlink control information (DCI) over a PDCCH) may indicate the PC loop or OL PC index using SRI or an OLPC indication field. Additionally, or alternatively, the increase transmission power acceptance message may include a dedicated transmission such as at least one of a scheduling downlink control information (DCI) message received via a physical downlink control channel (PDCCH), a MAC-CE message, or a radio resource control (RRC) signal. In some aspects, when the increase transmission power request message includes a request for a specific transmission power increase, the increase transmission power acceptance message may include an indication of whether the base station 804 grants permission for the UE 802 to transmit one or more subsequent transmissions at the requested specific transmission power increase. In some aspects, when the increase transmission power request message includes a request for a specific transmission power increase, the increase transmission power acceptance message may include an indication of whether the base station 804 grants permission for the UE 802 to transmit one or more subsequent transmissions at the requested specific transmission power increase.

In some aspects, the increase transmission power acceptance message may include an acceptance by the base station 804 for the UE 802 to implement a transmission power increase sufficient to transmit a beamformed transmission towards an object that is within a distance of the UE 802 and receive a reflection of that beamformed transmission after the beamformed transmission is reflected off the object. For example, the UE 802 may determine a position of an object within a distance of the UE 802. Based on the distance of the object from the UE 802, the UE 802 may transmit an increase transmission power request message to the base station 804 requesting that the UE 802 transmit a beamformed transmission in a direction of the object having a transmission power that is sufficient to be reflected off the object and received by the UE 802. In response to receiving, the increase transmission power request message, the base station 804 may transmit an increase power transmission power acceptance message permitting the UE 802 to transmit a beamformed transmission at the requested increased transmission power and one or more direction including the direction of the object. In some aspects, the direction of the object may be indicated in the increase transmission power acceptance message using sounding reference signal (SRS) resource indicator (SRI).

The increase transmission power acceptance message may include a scheduling of the transmission at the increased transmission power. For example, the increase transmission power acceptance message may schedule one or more frequencies and/or one or more time slots for transmitting the transmission at the increase transmission power. The increase transmission power acceptance message may indicate one or more wideband (WB) uplink (UL) channels for the UE 802 to transmit the transmission. In some aspects, the one or more WB UL channels comprise a physical uplink shared channel (PUSCH). In some aspects, the increase transmission power acceptance message may indicate that the UE 802 is to transmit the transmission using a sounding reference signals (SRS). The base station 804 may schedule the transmission at the increased transmission power to avoid interference with one or more other transmissions associated with the base station 804.

Additionally, or alternatively, the base station 804 may schedule one or more other transmissions associated with the base station 804 to avoid interference with the transmission from the UE 802 at the increased transmission power. For example, after receiving an increase transmission power request message from the UE 802, the base station 804 may coordinate one or more other transmissions between the base station and one or more other UEs to avoid interference with the transmission from the UE 802 at the increased transmission power. During or after coordinating one or more other transmissions between the base station and one or more other UEs, the base station 804 may transmit an increase transmission power acceptance message for reception by the UE 802. In some aspects, the interference may include at least one of co-channel interference (CCI) or cross-link interference (CLI).

Additionally, or alternatively, the base station 804 may coordinate scheduling with one or more other base stations associated with one or more other cells adjacent to the cell associated with the base station and/or near a location of the UE 802 to avoid interference with the transmission from the UE 802 at the increased transmission power. For example, the base station 804 may determine whether the UE 802 is on an edge of a cell associated with the base station 804. The base station 804 may also identify one or more other base stations associated with one or more cells that are adjacent to the cell associated with the base station 804 and/or near the location of the UE 802. The base station 804 may receive an indication of one or more uplink transmissions associated with the one or more other base stations and coordinate those one or more uplink transmission with the transmission from the UE 802 at the increased transmission power to avoid interference. In some aspects, the one or more other UL transmissions may include at least one of a frequency division multiplexing (FDM) UL transmission or a multi-user, multiple-input, multiple-output (MU-MIMO) UL transmission. In some aspects, the interference may include at least one of co-channel interference (CCI) or cross-link interference (CLI).

Alternatively, in response to transmitting an increase transmission power request message to the base station 804, the UE 802 may receive from the base station 804 an increase transmission power rejection message preventing the UE 802 from increasing a transmission power of one or more subsequent transmissions. For example, due to a lack of transmission scheduling availability within a cell or one or more adjacent cells and/or the potential for interference with one or more other transmission within the cell or one or more adjacent cells, the base station 804 may determine that the UE 802 is not permitted to increase a transmission power of one or more subsequent transmissions. In some aspects, when the increase transmission power request message includes a request for a specific transmission power increase, the increase transmission power acceptance message may include an indication that the base station 804 grants permission for the UE 802 to transmit one or more subsequent transmissions according to a different specific transmission power increase rather than the requested specific transmission power increase. For example, due to the potential for interference with one or more other transmission within the cell or one or more adjacent cells, the base station 804 may determine that the UE 802 is permitted to transmit one or more subsequent transmissions according to a different specific transmission power increase rather than the requested specific transmission power increase.

At 812, the UE 802 may send (e.g., transmit) a transmission (e.g., data, a data packet, a data message, a message, a control message) using an increased power. The UE 802 may transmit a transmission using an increased power for reflection by the object 806. In some aspects, the transmission may include at least one of a null transmission or a data transmission. For example, the transmission may be a null transmission used for reflection off the object and subsequent reception of the reflection of the transmission by the UE 802. The null transmission may be used when the transmission is scheduled during a time period coordinated by the base station 804 to avoid interference. Because the null transmission is transmitted at a time to avoid interference, the UE 802 may receive the reflection of the null transmission and determine that the UE 802 transmitted the null transmission because no other null transmissions are transmitted at the same or concurrent time as the null transmission. As another example, the transmission may be a data transmission used for reflection off the object and subsequent reception of the reflection of the transmission by the UE 802. The data transmission may be used so that when the UE 802 receives the reflection of the transmission, the UE 802 may be able to determine that the reflection is a reflection of the transmission transmitted by the UE 802 and not a different transmission.

In some aspects, the transmission may include one or more wideband (WB) uplink (UL) channels, and, in some aspects, the one or more WB UL channels may include a physical uplink shared channel (PUSCH). In some aspects, the transmission may include a sounding reference signal (SRS). In some aspects, the increase transmission power may include a transmission power that is greater than a current transmission power control (TPC) state associated with the UE. In some aspects, the increase transmission power request message may include an indication of a requested increase transmission power relative to a current transmission power control (TPC) state associated with the UE. For example, the increase transmission power may include the requested increase transmission power and the requested increase transmission power may be based on a capability of the UE. In some aspects, the increase transmission power may include a maximum transmission power associated with the UE.

In some aspects, the transmission may transmitted by the UE 802 is a direction associated with the object. For example, the UE 802 may determine a position of an object within a distance of the UE 802. Based on the distance of the object from the UE 802, the UE 802 may transmit an increase transmission power request message to the base station 804 requesting that the UE 802 transmit a beamformed transmission in a direction of the object having a transmission power that is sufficient to be reflected off the object and received by the UE 802. In response to receiving, the increase transmission power request message, the base station 804 may transmit an increase power transmission power acceptance message permitting the UE 802 to transmit a beamformed transmission at the requested increased transmission power and one or more direction including the direction of the object. In some aspects, the direction of the object may be indicated in the increase transmission power acceptance message using sounding reference signal (SRS) resource indicator (SRI). Based on receiving the increase power transmission power acceptance message and indicating the direction of the object, the UE 802 may transmit a beamformed transmission at the increased power.

At 814, the UE 802 may receive a reflection of the transmission reflected off the object 806. At 816, the UE 802 may determine at least one parameter associated with the object 806 based on the reflection of the transmission reflected off the object 806. In some aspects, the UE 802 may determine at least one of a position of the object 806, a velocity of the object 806, a rotation of the object 806, or a direction of movement of the object 806 based on the received increase power transmission reflected off the object 806.

FIG. 9 is conceptual signaling diagram illustrating an example environment 900 for network-assisted environmental sensing according to some aspects. In the example shown in FIG. 9, a user equipment (UE) 902 is in wireless communication with a base station 904 over one or more wireless communication links. The example environment 900 may also include an object 906 that may be within a distance of the UE 902. In some aspects, the object 906 may be within a distance of the UE 902 to allow the object 906 to receive a transmission from the UE 902 and reflect that transmission back to the UE 902. In some aspects, the object 906 may be located at a position that is not along a direct path (e.g., offset from a direct path) between the UE 902 and the base station 904. For example, the object 906 may be about 1 inch, about 1 foot, about 10 feet, about 100 feet, about 500 feet, about 1000 feet, about 1 mile, about 10 miles, about 100 miles, about 1000 miles from a direct path between the UE 902 and the base station 904. In some aspects, the object 906 may be located at a position that is within a distance of the UE 902 that the UE 902 is capable of reaching with a transmission, for example, at a maximum transmission power of the UE 902 or a transmission power specified by the base station 904 by which the UE 902 is permitted to send a transmission. The object 906 may be any object capable of reflecting a wireless transmission. In some aspects, the object 906 may be a heartbeat detection device, a respiration rate monitoring device, a human, a hand of a human, a fixed object (e.g., a statue, a building, a street sign), a moving device (e.g., an automobile, a motorcycle, an airplane), or the like. In some aspects, the example environment 900 may include one or more aspects of a bistatic radar system such as the example environment 750 illustrated in FIG. 7B. Each of the UE 902 and the base station 904 may correspond to any of the entities, gNodeBs, UEs, or the like as shown in FIGS. 1-4, 7A, 7B, and 8. In some aspects, the object 906 may correspond to any of the objects described in FIGS. 7A and 7B.

At 908, the base station 904 may transmit an increase transmission power message to the UE 902. For example, the UE 902 may be configured to transmit transmissions at a transmission power associated with a first transmission power. In some aspects, the first transmission power may be associated with a current transmission power control (TPC) state of the UE 902. The UE 902 may receive the increase power message from the base station 904 to increase a transmission power for one or more subsequent transmissions. For example, the UE 902 may receive an increase transmission power message from the base station 904 instructing the UE 902 to increase the transmission power from the first transmission power to a second transmission power that is greater than the first transmission power. In some aspects, the second transmission power may be a maximum transmission power associated with the UE 902. For example, the maximum transmission power may be associated with a maximum transmission capability of the UE 902.

In some aspects, the increase transmission power message may include a request for a transmission power increase sufficient for the UE 902 to transmit an omni-directional or a non-beamformed transmission for reflection by an object that is within a distance of the UE 902 towards the base station 904. For example, the base station 904 and/or the UE 902 may determine a position of one or more different objects and select the object that may be best suited for reflecting a signal or transmission. In some aspects, the positions of each of the one or more objects may be determined by stored geographical mappings of the one or more objects by the UE 902 and/or the base station 904. The best suited object may be an object that is within a maximum transmission distance of the UE 902, is the most likely to adequately reflect a transmission, is the closest to the UE 902, has the least amount of obstructions along a direct transmission path to the UE 902, has the least amount of obstructions along a direct transmission path to the base station 904, a combination thereof, or the like. For example, the UE 902 may determine that the object is within a distance of the UE 902. Based on the distance of the object from the UE 802, the base station 904 may transmit an increase transmission power message to the UE 902 requesting that the UE 902 transmit an omni-directional or a non-beamformed transmission having a transmission power that is sufficient to be reflected off the object and towards the base station 904.

In some aspects, the increase transmission power message may include an indication for the UE 902 to increase a transmission power sufficient to transmit a beamformed transmission towards an object that is within a distance of the UE 902 for reflection of that beamformed transmission off the object and towards the base station 904. For example, the base station 904 and/or the UE 902 may determine a position of an object within a distance of the UE 902. Based on the distance of the object from the UE 902, the base station 904 may transmit an increase transmission power message to the UE 902 instructing the UE 902 to transmit a beamformed transmission in a direction of the object having a transmission power that is sufficient to be reflected off the object and towards the base station 904 for reception by the base station 904. In some aspects, the direction of the object may be indicated in the increase transmission power message using sounding reference signal (SRS) resource indicator (SRI). Additionally, or alternatively, the increase transmission power message may include an indication of a determined bandwidth of the transmission. For example, the increase transmission power message may include a bandwidth that is adequate for the transmission of the transmission.

In some aspects, the UE 902 may determine an amount of transmission power increase after receiving an increase transmission power message from the base station 904. For example, the base station 904 and/or the UE 902 may determine a distance between the UE 902 and the object. Based on the distance between the UE 902 and the object, the UE 902 may receive an increase transmission power message from the base station 904 and transmit an omni-directional or a non-beamformed transmission having a transmission power that is sufficient to be reflected off the object and received by the base station.

In some aspects, the base station 904 may determine an amount of transmission power increase. For example, the base station 904 may determine a position of the UE 902 and a position of one or more objects near the UE 902. After determining the position of the UE 902 and the object, the base station 904 may determine an amount of transmission power increase for the UE 802 and include the amount of transmission power increase in the increase transmission power message for transmission to the UE 902.

In some aspects, the UE 902 may receive an increase transmission power message from the base station 904 instructing the UE 902 to increase a transmission power of one or more subsequent transmissions. The increase transmission power message may indicate that the UE 902 is instructed to transmit one or more subsequent transmissions at the second transmission power described herein. In some aspects, a set of PC loops and/or open-loop (OLPC) parameters may be provisioned for sensing UL transmissions. The increase transmission power message (e.g., included in scheduling downlink control information (DCI) over a PDCCH) may indicate the PC loop or OL PC index using SRI or an OLPC indication field. Additionally, or alternatively, the increase transmission power message may include a dedicated transmission such as at least one of a scheduling downlink control information (DCI) message received via a physical downlink control channel (PDCCH), a MAC-CE message, or a radio resource control (RRC) signal.

In some aspects, the increase transmission power message may include an instruction by the base station 904 for the UE 902 to implement a transmission power increase sufficient to transmit a beamformed transmission towards an object that is within a distance of the UE 902 and so that the base station 904 receives a reflection of that beamformed transmission after the beamformed transmission is reflected off the object. For example, the base station 904 and/or the UE 902 may determine a position of an object within a distance of the UE 902. Based on the distance of the object from the UE 902, the UE 902 may receive an increase transmission power message from the base station 904 instructing the UE 902 transmit a beamformed transmission in a direction of the object having a transmission power that is sufficient to be reflected off the object and received by the base station 904. In some aspects, the direction of the object may be indicated in the increase transmission power acceptance message using sounding reference signal (SRS) resource indicator (SRI).

The increase transmission power acceptance message may include a scheduling of the transmission at the increased transmission power. For example, the increase transmission power acceptance message may schedule one or more frequencies and/or one or more time slots for transmitting the transmission at the increase transmission power. The increase transmission power acceptance message may indicate one or more wideband (WB) uplink (UL) channels for the UE 902 to transmit the transmission. In some aspects, the one or more WB UL channels comprise a physical uplink shared channel (PUSCH). In some aspects, the increase transmission power acceptance message may indicate that the UE 902 is to transmit the transmission using a sounding reference signals (SRS). The base station 904 may schedule the transmission at the increased transmission power to avoid interference with one or more other transmissions associated with the base station 904.

At 910, the base station 904 may schedule one or more other uplink (UL) transmissions to avoid interference with a transmission from the UE 902 for reception by the base station 904. For example, before, during, or after transmitting an increase transmission power message to the UE 902, the base station 904 may coordinate one or more other transmissions between the base station and one or more other UEs to avoid interference with the transmission from the UE 902 at the increased transmission power. In some aspects, the interference may include at least one of co-channel interference (CCI) or cross-link interference (CLI).

Additionally, or alternatively, the base station 804 may coordinate scheduling with one or more other base stations associated with one or more other cells adjacent to the cell associated with the base station and/or near a location of the UE 902 to avoid interference with the transmission from the UE 902 at the increased transmission power. For example, the base station 904 may determine whether the UE 902 is on an edge of a cell associated with the base station 904. The base station 904 may also identify one or more other base stations associated with one or more cells that are adjacent to the cell associated with the base station 904 and/or near the location of the UE 902. The base station 904 may receive an indication of one or more uplink transmissions associated with the one or more other base stations and coordinate those one or more uplink transmission with the transmission from the UE 902 at the increased transmission power to avoid interference. In some aspects, the one or more other UL transmissions may include at least one of a frequency division multiplexing (FDM) UL transmission or a multi-user, multiple-input, multiple-output (MU-MIMO) UL transmission. In some aspects, the interference may include at least one of co-channel interference (CCI) or cross-link interference (CLI).

At 912, the UE 902 may send (e.g., transmit) a transmission (e.g., data, a data packet, a data message, a message, a control message) using an increased power. In some aspects, the UE 902 may transmit the transmission using the increased power for reflection by the object 906. The UE 902 may transmit a transmission using an increased power for reflection by the object 906. In some aspects, the transmission may include at least one of a null transmission or a data transmission. For example, the transmission may be a null transmission used for reflection off the object and subsequent reception of the reflection of the transmission by the base station 904. The null transmission may be used when the transmission is scheduled during a time period coordinated by the base station 904 to avoid interference. Because the null transmission is transmitted at a time to avoid interference, the base station 904 may receive the reflection of the null transmission and determine that the UE 902 transmitted the null transmission because no other null transmissions are transmitted at the same or concurrent time as the null transmission. As another example, the transmission may be a data transmission used for reflection off the object and subsequent reception of the reflection of the transmission by the base station 904. The data transmission may be used so that when the base station 904 receives the reflection of the transmission, the base station 904 may be able to determine that the reflection is a reflection of the transmission transmitted by the UE 802 and not a different transmission.

In some aspects, the transmission may include one or more wideband (WB) uplink (UL) channels, and, in some aspects, the one or more WB UL channels may include a physical uplink shared channel (PUSCH). In some aspects, the transmission may include a sounding reference signal (SRS). In some aspects, the increase transmission power may include a transmission power that is greater than a current transmission power control (TPC) state associated with the UE. In some aspects, the increase transmission power request message may include an indication of an increase transmission power relative to a current transmission power control (TPC) state associated with the UE. For example, the increase transmission power may include an increase transmission power based on a capability of the UE. In some aspects, the increase transmission power may include a maximum transmission power associated with the UE.

In some aspects, the transmission may be transmitted by the UE 902 is a direction associated with the object. For example, the base station 904 and/or the UE 902 may determine a position of an object within a distance of the UE 902. Based on the distance of the object from the UE 902, the UE 902 may transmit a beamformed transmission in a direction of the object having a transmission power that is sufficient to be reflected off the object and received by the base station 904. The base station 904 may transmit an increase power transmission power message instructing the UE 902 to transmit a beamformed transmission at the instructed increased transmission power and one or more direction including the direction of the object. In some aspects, the direction of the object may be indicated in the increase transmission power message using sounding reference signal (SRS) resource indicator (SRI). Based on receiving the increase transmission power message and indicating the direction of the object, the UE 802 may transmit a beamformed transmission at the increased power for reflection at the object and subsequent reception by the base station 904. Additionally, or alternatively, the increase transmission power message may include an indication of a determined bandwidth of the transmission. For example, the increase transmission power message may include a bandwidth that is adequate for the transmission of the transmission.

At 914, the base station 904 may receive a reflection of the transmission transmitted using the increased power after the transmission is reflected off the object 906. In some aspects, the base station 904 may receive a reflection of the transmission transmitted using the increased power after the transmission is reflected off the object 906 in response to the base station 904 transmitting the increase transmission power message. In some aspects, the base station 904 may determine at least one parameter associated with the object 906 based on the reflection of the transmission reflected off the object 906. In some aspects, the base station 904 may determine at least one of a position of the object 906, a velocity of the object 906, a rotation of the object 906, or a direction of movement of the object 906 based on the received increase power transmission reflected off the object 906. In some aspects, for example, when the transmission is a data transmission, the base station 904 may use the object to reflect a transmission from the UE 902 and go around an obstruction block direct communication between the UE 902 and the base station 904.

Figure 10:
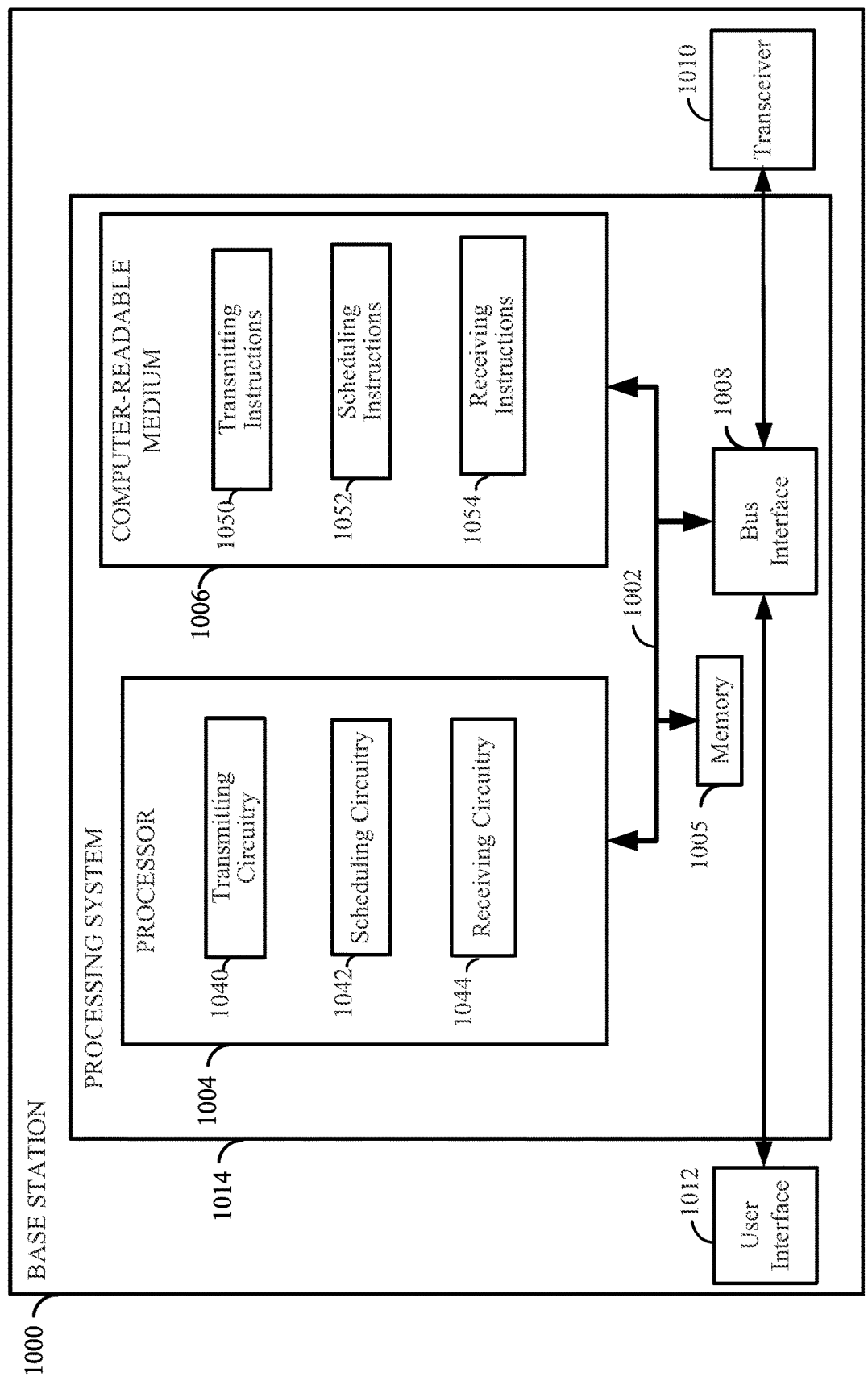
FIG. 10 is a block diagram conceptually illustrating an example of a hardware implementation for a base station according to some aspects.

FIG. 10 is a block diagram illustrating an example of a hardware implementation for a base station 1000 employing a processing system 1014. For example, the base station 1000 may be any of the user equipment (UEs) or base stations (e.g., gNB or eNB) illustrated in any one or more of FIGS. 1-4, 7A, 7B, 8, and 9.

The base station 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1000 may be configured to perform any one or more of the functions described herein. That is, the processor 1004, as utilized in the base station 1000, may be used to implement any one or more of the processes described herein. The processor 1004 may in some instances be implemented via a baseband or modem chip and in other implementations, the processor 1004 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of software stored on the computer-readable storage medium 1006. The software, when executed by the processor 1004, causes the processing system 1014 to perform the various functions described herein for any particular apparatus. The computer-readable storage medium 1006 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006.

The computer-readable storage medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include transmitting circuitry 1040 configured to transmit an increase transmission power message to a user equipment (UE) for the UE to transmit a transmission at an increased transmission power. The transmitting circuitry 1040 may also be configured to transmit an increase transmission power acceptance message to a user equipment (UE) for the UE to transmit a transmission at an increased transmission power and in response to receiving an increased transmission power request message from the UE. The transmitting circuitry 1040 may be configured to execute transmitting instructions 1050 stored in the computer-readable storage medium 1006 to implement any of the one or more of the functions described herein.

The processor 1004 may also include scheduling circuitry 1042 configured to schedule one or more other uplink (UL) transmissions to avoid interference with a transmission from the UE for reception by the base station. The scheduling circuitry 1042 may also be configured to schedule one or more beams for a UE to transmit a transmission using an increased transmission power for reflection off at least one object and for reception by the base station 1000. The scheduling circuitry 1042 may be configured to execute scheduling instructions 1052 stored in the computer-readable storage medium 1006 to implement any of the one or more of the functions described herein.

The processor 1004 may further include receiving circuitry 1044 configured to receive the transmission from the UE transmitted at the increase transmission power after the transmission is reflected off at least one object within a distance of the UE in response to transmitting the increase transmission power message. The receiving circuitry 1044 may also be configured to receive an increase transmission power request message from a UE. The receiving circuitry 1044 may be configured to execute receiving instructions 1054 stored in the computer-readable storage medium 1006 to implement any of the one or more of the functions described herein.

Figure 11:
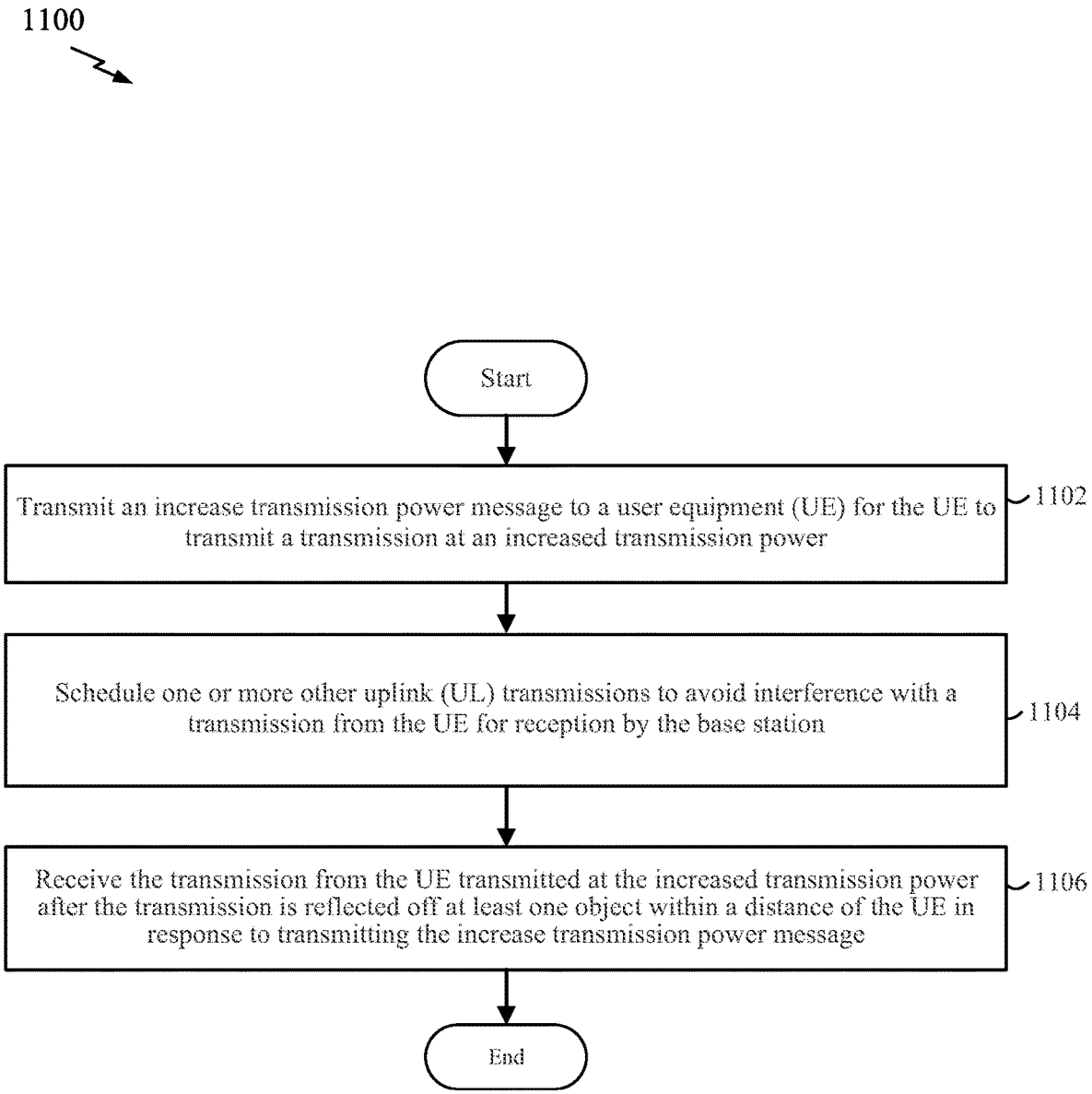
FIG. 11 is a flow chart of a method for network-assisted environmental sensing according to some aspects.

FIG. 11 is a flow chart 1100 of a method for utilizing network-assisted environmental sensing according to some aspects. As described below, some or all illustrated features may be omitted in a particular implementation within the scope of the present disclosure, and some illustrated features may not be required for implementation of all aspects. In some examples, the method may be performed by the base station 1000, as described herein, and illustrated in FIG. 10, by a processor or processing system, or by any suitable means for carrying out the described functions.

At block 1102, the base station 1000 may transmit an increase transmission power message to a user equipment (UE) for the UE to transmit a transmission at an increased transmission power. The transmitting circuitry 1040 together with the transceiver 1010, shown and described above in connection with FIG. 10 may provide a means to transmit an increase transmission power message to a UE for the UE to transmit a transmission at an increased transmission power.

At block 1104, the base station 1000 may schedule one or more other uplink (UL) transmissions to avoid interference with a transmission from the UE for reception by the base station. The scheduling circuitry 1042, shown and described above in connection with FIG. 10 may provide a means to schedule one or more other uplink (UL) transmissions to avoid interference with a transmission from the UE for reception by the base station.

At block 1106, the base station 1000 may receive the transmission from the UE transmitted at the increased transmission power after the transmission is reflected off at least one object within a distance of the UE in response to transmitting the increase transmission power message. The receiving circuitry 1044 together with the transceiver 1010, shown and described above in connection with FIG. 10 may provide a means to receive the transmission from the UE transmitted at the increased transmission power after the transmission is reflected off at least one object within a distance of the UE in response to transmitting the increase transmission power message.

In one configuration, the base station 1000 includes means for performing the various functions and processes described in relation to FIG. 10. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-4, 7A, 7B, 8, and 9 and utilizing, for example, the processes and/or algorithms described herein in relation to FIG. 11.

Figure 12:
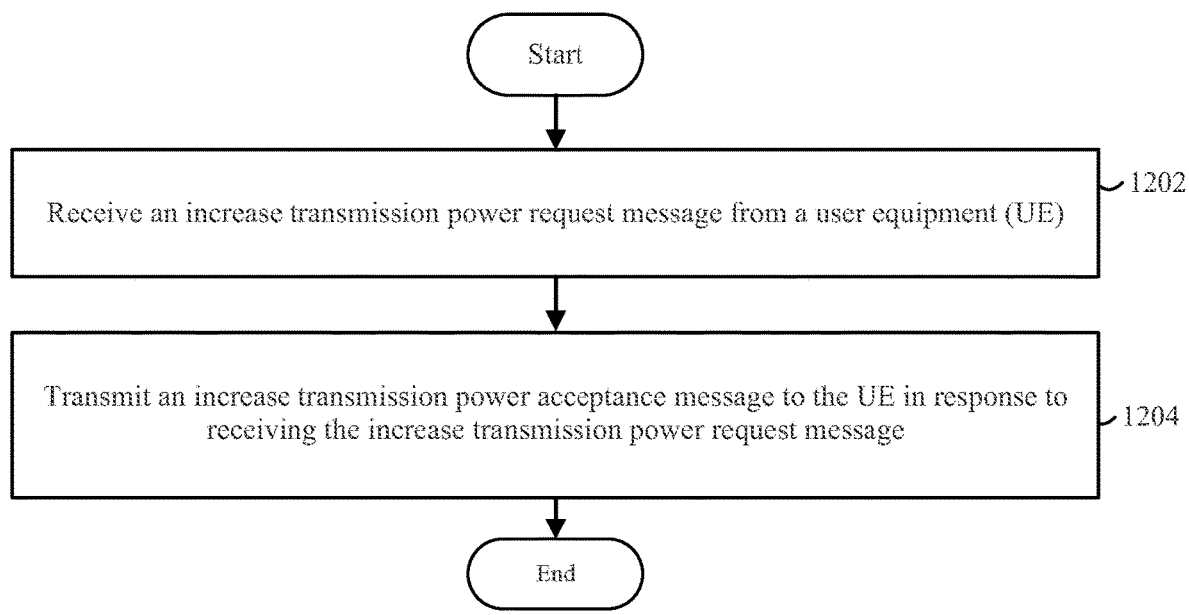
FIG. 12 is a flow chart of a method for network-assisted environmental sensing according to some aspects.

FIG. 12 is a flow chart 1200 of a method for utilizing network-assisted environmental sensing according to some aspects. As described below, some or all illustrated features may be omitted in a particular implementation within the scope of the present disclosure, and some illustrated features may not be required for implementation of all aspects. In some examples, the method may be performed by the base station 1000, as described herein, and illustrated in FIG. 10, by a processor or processing system, or by any suitable means for carrying out the described functions.

At block 1202, the base station 1000 may receive an increase transmission power request message from a user equipment (UE). The receiving circuitry 1044 together with the transceiver 1010, shown and described above in connection with FIG. 10 may provide a means to receive an increase transmission power request message from a user equipment (UE). At block 1204, the base station 1000 may transmit an increase transmission power acceptance message to the UE in response to receiving the increase transmission power request message. The transmitting circuitry 1040 together with the transceiver 1010, shown and described above in connection with FIG. 10 may provide a means to transmit an increase transmission power acceptance message to the UE in response to receiving the increase transmission power request message.

In one configuration, the base station 1000 includes means for performing the various functions and processes described in relation to FIG. 12. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-4, 7A, 7B, 8, and 9 and utilizing, for example, the processes and/or algorithms described herein in relation to FIG. 12.

Figure 13:
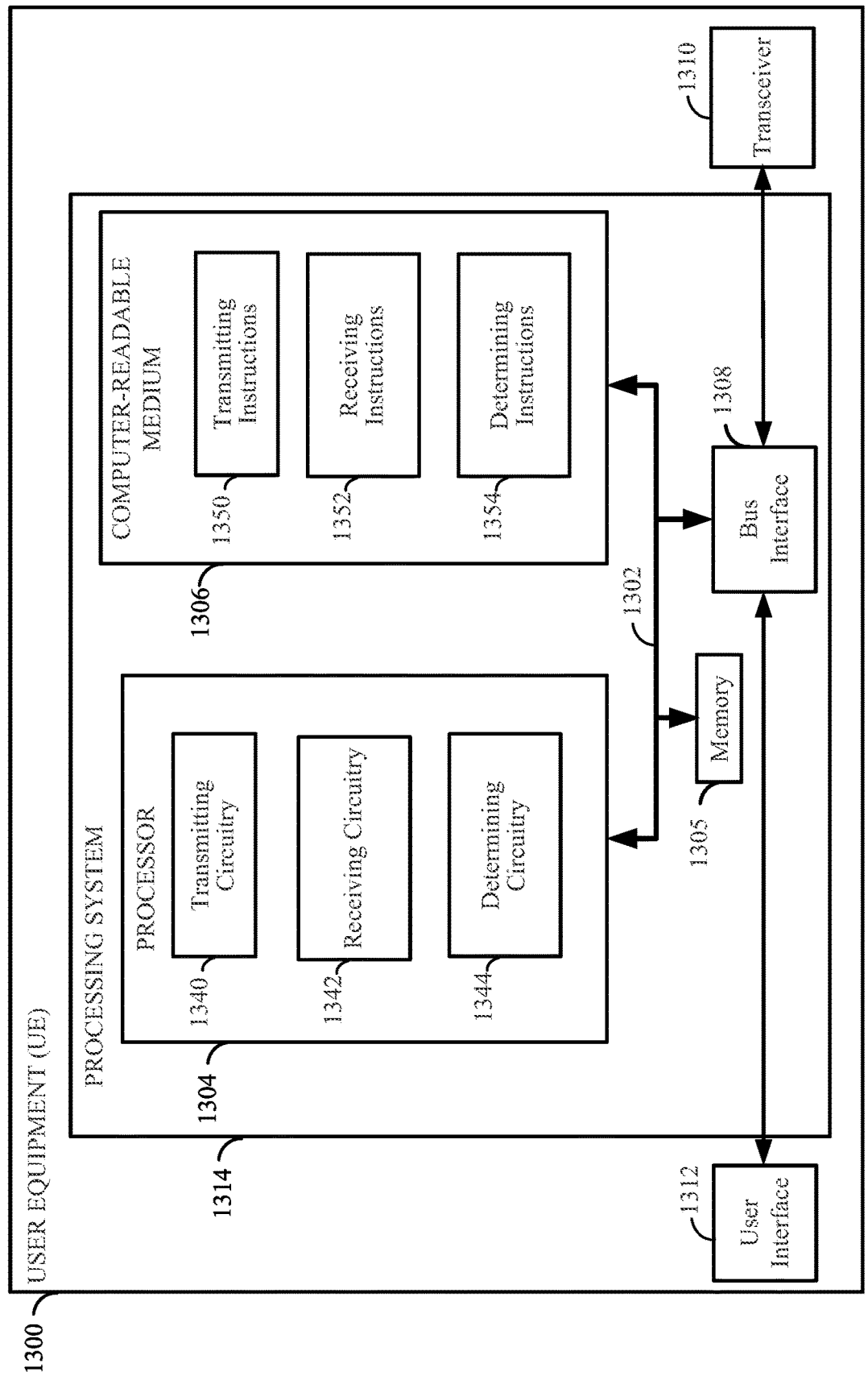
FIG. 13 is a block diagram conceptually illustrating an example of a hardware implementation for a user equipment (UE) according to some aspects of the disclosure.

FIG. 13 is a block diagram illustrating an example of a hardware implementation for a user equipment (UE) 1300 employing a processing system 1314 according to some aspects. For example, the UE 1300 may correspond to any of the devices or systems shown and described herein in any one or more of FIGS. 1-4, 7A, 7B, 8, and 9.

In accordance with various aspects of the disclosure, an element, or any portion of an element, or any combination of elements may be implemented with a processing system 1314 that includes one or more processors 1304. The processing system 1314 may be substantially the same as the processing system 1014 illustrated in FIG. 10, including a bus interface 1308, a bus 1302, a processor 1304, and a computer-readable storage medium 1306. Furthermore, the UE 1300 may include a user interface 1312 and a transceiver 1310 substantially similar to those described above in FIG. 10. That is, the processor 1304, as utilized in the UE 1300, may be used to implement any one or more of the processes described herein.

In some aspects of the disclosure, the processor 1304 may include circuitry configured for various functions. For example, the processor 1304 may include transmitting circuitry 1340 (e.g., sending circuitry) configured to transmit an increase transmission power request message to a base station. The transmitting circuitry 1340 may also be configured to transmit a transmission using an increased transmission power for reflection by at least one object within a distance of the UE based on the increase transmission power acceptance message. The transmitting circuitry 1340 may further be configured to transmit a transmission using an increased transmission power for reflection by at least one object within a distance of the UE based on an increase transmission power message. The transmitting circuitry 1340 may be configured to execute transmitting instructions 1350 (e.g., sending instructions) stored in the computer-readable storage medium 1306 to implement any of the one or more of the functions described herein.

The processor 1304 may also include receiving circuitry 1342 configured to receive an increase transmission power acceptance message from the base station in response to transmitting the increase transmission power request message. The receiving circuitry 1342 may also be configured to receive a reflection of a transmission reflected off at least one object. The receiving circuitry 1342 may further be configured to receive an increase transmission power message from a base station for the UE to transmit a transmission at an increased transmission power. The receiving circuitry 1342 may further be configured to execute receiving instructions 1352 stored in the computer-readable storage medium 1306 to implement any of the one or more of the functions described herein.

The processor 1304 may further include determining circuitry 1344 configured to determine at least one parameter associated with the object based on the reflection of the transmission reflected off the at least one object. The determining circuitry 1344 may further be configured to execute determining instructions 1354 stored in the computer-readable storage medium 1306 to implement any of the one or more of the functions described herein.

Figure 14:
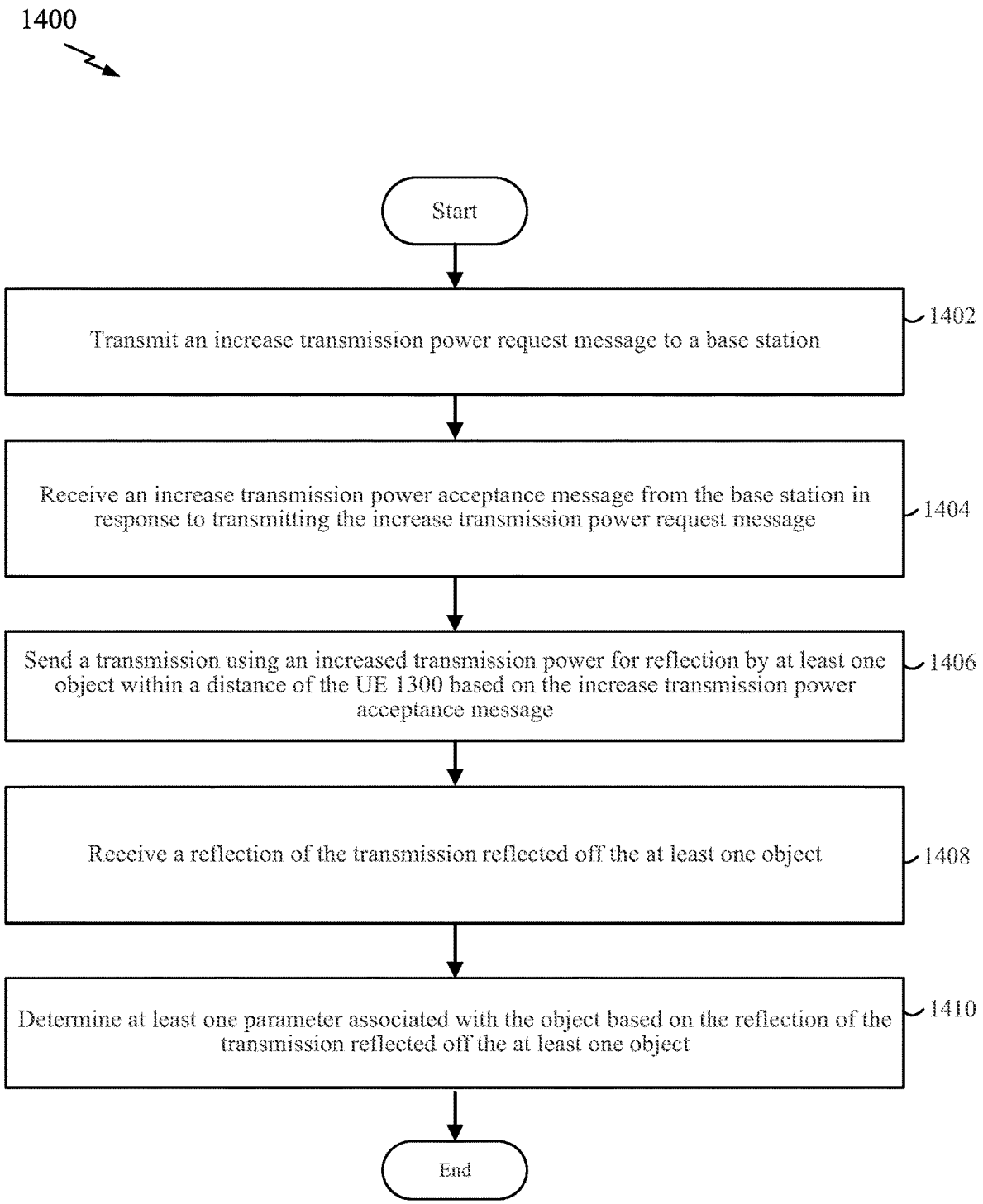
FIG. 14 is a flow chart of a method for network-assisted environmental sensing according to some aspects.

FIG. 14 is a flow chart 1400 of a method for utilizing network-assisted environmental sensing according to some aspects. As described below, some or all illustrated features may be omitted in a particular implementation within the scope of the present disclosure, and some illustrated features may not be required for implementation of all aspects. In some examples, the method may be performed by the UE 1300, as described herein, and illustrated in FIG. 13, by a processor or processing system, or by any suitable means for carrying out the described functions.

At block 1402, the UE 1300 may transmit an increase transmission power request message to a base station. The transmitting circuitry 1340 together with the transceiver 1310, shown and described above in connection with FIG. 13 may provide a means to transmit an increase transmission power request message to a base station. At block 1404, the UE 1300 may receive an increase transmission power acceptance message from the base station in response to transmitting the increase transmission power request message. The receiving circuitry 1342 together with the transceiver 1310, shown and described above in connection with FIG. 13 may provide a means to receive an increase transmission power acceptance message from the base station in response to transmitting the increase transmission power request message.

At block 1406, the UE 1300 may send a transmission using an increased transmission power for reflection by at least one object within a distance of the UE 1300 based on the increase transmission power acceptance message. The transmitting circuitry 1340 together with the transceiver 1310, shown and described above in connection with FIG. 13 may provide a means to send a transmission using an increased transmission power for reflection by at least one object within a distance of the UE 1300 based on the increase transmission power acceptance message. At block 1408, the UE 1300 may receive a reflection of the transmission reflected off the at least one object. The receiving circuitry 1342 together with the transceiver 1310, shown and described above in connection with FIG. 13 may provide a means to receive a reflection of the transmission reflected off the at least one object. At block 1410, the UE 1300 may determine at least one parameter associated with the object based on the reflection of the transmission reflected off the at least one object. The determining circuitry 1344, shown and described above in connection with FIG. 13 may provide a means to determine at least one parameter associated with the object based on the reflection of the transmission reflected off the at least one object.

In one configuration, the UE 1300 includes means for performing the various functions and processes described in relation to FIG. 14. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-4, 7A, 7B, 8, and 9 and utilizing, for example, the processes and/or algorithms described herein in relation to FIG. 14.

Figure 15:
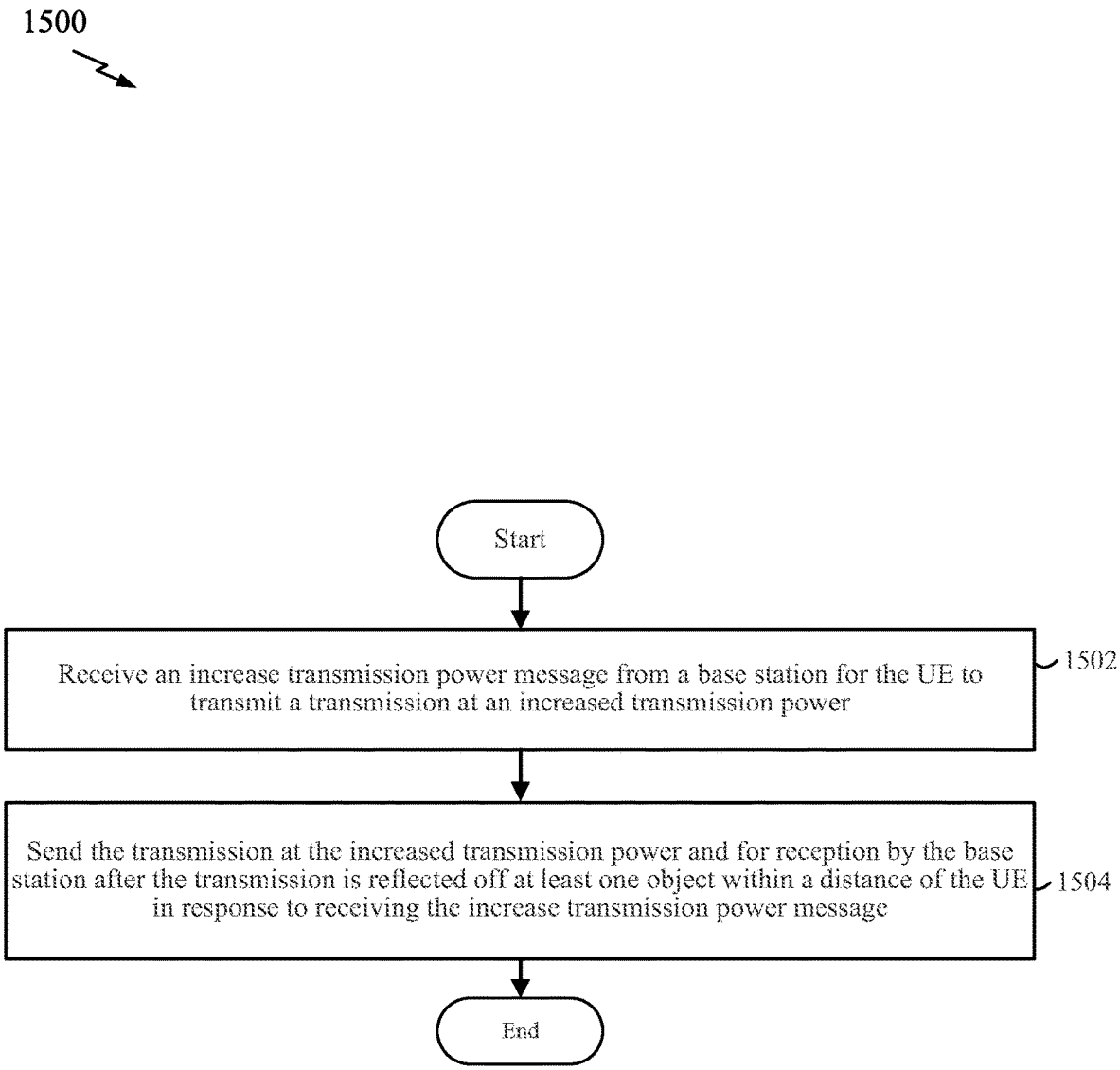
FIG. 15 is a flow chart of a method for network-assisted environmental sensing according to some aspects.

FIG. 15 is a flow chart 1500 of a method for utilizing network-assisted environmental sensing according to some aspects. As described below, some or all illustrated features may be omitted in a particular implementation within the scope of the present disclosure, and some illustrated features may not be required for implementation of all aspects. In some examples, the method may be performed by the UE 1300, as described herein, and illustrated in FIG. 13, by a processor or processing system, or by any suitable means for carrying out the described functions.

At block 1502, the UE 1300 may receive an increase transmission power message from a base station for the UE 1300 to transmit a transmission at an increased transmission power. The receiving circuitry 1342 together with the transceiver 1310, shown and described above in connection with FIG. 13 may provide a means to receive an increase transmission power message from a base station for the UE 1300 to transmit a transmission at an increased transmission power. At block 1504, the UE 1300 may send (e.g., transmit) a transmission (e.g., data, a data packet, a data message, a message, a control message) at the increased transmission power and for reception by the base station after the transmission is reflected off at least one object within a distance of the UE 1300 in response to receiving the increase transmission power message. The transmitting circuitry 1040 together with the transceiver 1010, shown and described above in connection with FIG. 10 may provide a means to send a transmission at the increased transmission power and for reception by the base station after the transmission is reflected off at least one object within a distance of the UE 1300 in response to receiving the increase transmission power message.

In one configuration, the UE 1300 includes means for performing the various functions and processes described in relation to FIG. 15. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-4, 7A, 7B, 8, and 9 and utilizing, for example, the processes and/or algorithms described herein in relation to FIG. 15.

In a first aspect, a wireless communication device (e.g., a UE) may transmit an increase transmission power request message to a base station. The wireless communication device may also receive an increase transmission power acceptance message from the base station in response to transmitting the increase transmission power request message. The wireless communication device may further send a transmission using an increased transmission power for reflection by at least one object based on the increase transmission power acceptance message. In addition, the wireless communication device may receive a reflection of the transmission reflected off the at least one object. The wireless communication device may also determine at least one parameter associated with the object based on the reflection of the transmission reflected off the at least one object.

In a second aspect, alone or in combination with the first aspect, the at least one parameter may include at least one of a position of the at least one object, a velocity of the at least one object, a rotation of the at least one object, or a direction of movement of the at least one object.

In a third aspect, alone or in combination with one or more of the first and second aspects, the transmission may include at least one of a null transmission or a data transmission.

In a fourth aspect, alone or in combination with one or more of the first through third aspects, the transmission may include a sounding reference signal (SRS).

In a fifth aspect, alone or in combination with one or more of the first through fourth aspects, the increase transmission power request message may include an aperiodic uplink (UL) transmission.

In a sixth aspect, alone or in combination with one or more of the first through fifth aspects, the aperiodic UL transmission may include one of a dynamic grant (DG) PUSCH or an aperiodic sounding reference signal (A-SRS).

In a seventh aspect, alone or in combination with one or more of the first through sixth aspects, the increase transmission power request message may include at least one of a UE assistance information feedback, a medium access control (MAC) control element (MAC-CE) or a scheduling request (SR) message.

In an eighth aspect, alone or in combination with one or more of the first through seventh aspects, the increase transmission power acceptance message may include at least one of a scheduling downlink control information (DCI) message received via a physical downlink control channel (PDCCH), a MAC-CE message, or a radio resource control (RRC) signal.

In a ninth aspect, alone or in combination with one or more of the first through eighth aspects, the increase transmission power may include a transmission power that is greater than a current transmission power control (TPC) state associated with the UE.

In a tenth aspect, alone or in combination with one or more of the first through ninth aspects, the increase transmission power request message may include an indication of a requested increase transmission power relative to a current transmission power control (TPC) state associated with the UE.

In an eleventh aspect, alone or in combination with one or more of the first through tenth aspects, the increase transmission power may include the expected increase transmission power.

In a twelfth aspect, alone or in combination with one or more of the first through eleventh aspects, the expected increase transmission power may be based on a capability of the UE.

In a thirteenth aspect, alone or in combination with one or more of the first through twelfth aspects, the increase transmission power may include a maximum transmission power associated with the UE.

In a fourteenth aspect, alone or in combination with one or more of the first through thirteenth aspects, the increase transmission power request message may include at least one of an indication of one or more directions for transmitting the transmission or an indication of a determined bandwidth of the transmission.

In a fifteenth aspect, alone or in combination with one or more of the first through fourteenth aspects, the one or more directions may include a direction of a location of the at least one object.

In a sixteenth aspect, alone or in combination with one or more of the first through fifteenth aspects, the sending the transmission may include sending the transmission towards at least the direction of the location of the at least one object.

In a seventeenth aspect, alone or in combination with one or more of the first through sixteenth aspects, the indication of the one or more directions may include a sound reference signal (SRS) resource indicator (SRI).

In an eighteenth aspect, alone or in combination with one or more of the first through seventeenth aspects, the transmission may include an omni-directional transmission.

In a nineteenth aspect, a base station may transmit an increase transmission power message to a user equipment (UE) for the UE to transmit a transmission at an increased transmission power. The base station may also schedule one or more other uplink (UL) transmissions to avoid interference with a transmission from the UE for reception by the base station. The base station may further receive the transmission from the UE transmitted at the increased transmission power after the transmission is reflected off at least one object in response to transmitting the increase transmission power message.

In a twentieth aspect, alone or in combination with the nineteenth aspect, the increase transmission power may include a transmission power that is greater than a current transmission power control (TPC) state associated with the UE.

In a twenty-first aspect, alone or in combination with one or more of the nineteenth and the twentieth aspects, the increase transmission power may include a maximum transmission power associated with the UE.

In a twenty-second aspect, alone or in combination with one or more of the nineteenth through twenty-first aspects, the base station may further schedule a large bandwidth (BW) for the transmission.

In a twenty-third aspect, alone or in combination with one or more of the nineteenth through twenty-second aspects, the increase transmission power message may include an indication of the large BW for transmitting the transmission.

In a twenty-fourth aspect, alone or in combination with one or more of the nineteenth through twenty-third aspects, the increase transmission power message may include an indication of a direction towards a location of the at least one object for transmission of the transmission.

In a twenty-fifth aspect, alone or in combination with one or more of the nineteenth through twenty-fourth aspects, the one or more other UL transmissions may include at least one of a frequency division multiplexing (FDM) UL transmission or a multi-user, multiple-input, multiple-output (MU-MIMO) UL transmission.

In a twenty-sixth aspect, alone or in combination with one or more of the nineteenth through twenty-fifth aspects, the scheduling at least one of the frequency division multiplexing (FDM) uplink (UL) transmission or the multi-user, multiple-input, multiple-output (MU-MIMO) UL transmission to avoid the interference with the transmission may include receiving an indication of one or more UL transmissions for reception by one or more other base stations to avoid the interference with the transmission.

In a twenty-seventh aspect, alone or in combination with one or more of the nineteenth through twenty-sixth aspects, the transmission may include a beamformed transmission.

In a twenty-eighth aspect, alone or in combination with one or more of the nineteenth through twenty-seventh aspects, the transmitting the increase transmission power message to the UE for the UE to transmit the transmission at the increase transmission power may include transmitting a direction for transmitting the beamformed transmission that coincides with a direction of the at least one object.

In a twenty-ninth aspect, alone or in combination with one or more of the nineteenth through twenty-eighth aspects, the increased transmission power may include a transmission power that is greater than a current transmission power control (TPC) state associated with the UE.

In a thirtieth aspect, alone or in combination with one or more of the nineteenth through twenty-ninth aspects, the increase transmission power may include a maximum transmission power associated with the UE.

In a thirty-first aspect, alone or in combination with one or more of the nineteenth through thirtieth aspects, the interference may include at least one of co-channel interference (CCI) or cross-link interference (CLI).

In a thirty-second aspect, alone or in combination with one or more of the nineteenth through thirty-first aspects, the transmitting the increase transmission power message to the UE for the UE to transmit the transmission at the increase transmission power may be based on a position of the UE relative to an edge of a cell associated with the base station.

In a thirty-third aspect, alone or in combination with one or more of the nineteenth through thirty-second aspects, the increase transmission power message may include at least one of a scheduling downlink control information (DCI) message received via a physical downlink control channel (PDCCH), a MAC-CE message, or a radio resource control (RRC) signal.

In a thirty-fourth aspect, alone or in combination with one or more of the nineteenth through thirty-third aspects, the increase transmission power message may include a frequency for the UE to transmit the transmission.

In a thirty-fifth aspect, alone or in combination with one or more of the nineteenth through thirty-fourth aspects, the transmitting the increase transmission power message to the UE for the UE to transmit the transmission at the increase transmission power may be based on a position of the UE and a position of one or more obstructions within a distance of the UE.

In a thirty-sixth aspect, alone or in combination with one or more of the nineteenth through thirty-fifth aspects, the position of the one or more obstructions may include a position between the base station and the UE.

In a thirty-seventh aspect, alone or in combination with one or more of the nineteenth through thirty-sixth aspects, the increase transmission power may include a power of the transmission that is above a threshold power during the reception of the transmission by the base station.

In a thirty-eight aspect, alone or in combination with one or more of the nineteenth through thirty-seventh aspect, the object may be located a position that is not along a direct path between the UE and the base station.

In one configuration, a user equipment (UE) includes means for transmitting an increase transmission power request message to a base station, means for receiving an increase transmission power acceptance message from the base station in response to transmitting the increase transmission power request message, means for sending a transmission using an increased transmission power for reflection by at least one object within a distance of the UE based on the increase transmission power acceptance message, means for receiving a reflection of the transmission reflected off the at least one object, and means for determining at least one parameter associated with the object based on the reflection of the transmission reflected off the at least one object.

In one aspect, the aforementioned means for transmitting an increase transmission power request message to a base station, means for receiving an increase transmission power acceptance message from the base station in response to transmitting the increase transmission power request message, means for sending a transmission using an increased transmission power for reflection by at least one object within a distance of the UE based on the increase transmission power acceptance message, means for receiving a reflection of the transmission reflected off the at least one object, and means for determining at least one parameter associated with the object based on the reflection of the transmission reflected off the at least one object may be the processor(s) 904 shown in FIG. 9 configured to perform the functions recited by the aforementioned means. For example, the aforementioned means for transmitting an increase transmission power request message to a base station may include the transmitting circuitry 1340 and transceiver 1310 shown in FIG. 13. As another example, the aforementioned means for receiving an increase transmission power acceptance message from the base station in response to transmitting the increase transmission power request message may include the receiving circuitry 1342 and transceiver 1310 shown in FIG. 13. As yet another example, the aforementioned means for sending a transmission using an increased transmission power for reflection by at least one object within a distance of the UE based on the increase transmission power acceptance message may include the transmitting circuitry 1340 and the transceiver 1310 shown in FIG. 13. As yet another example, the aforementioned means for receiving a reflection of the transmission reflected off the at least one object may include the receiving circuitry 1342 and transceiver 1310 shown in FIG. 13. As yet another example, the aforementioned means for determining at least one parameter associated with the object based on the reflection of the transmission reflected off the at least one object may include the determining circuitry 1344 shown in FIG. 13. In another aspect, the aforementioned means may be a circuit or any apparatus configured to perform the functions recited by the aforementioned means.

In one configuration, a base station includes means for transmitting an increase transmission power message to a user equipment (UE) for the UE to transmit a transmission at an increased transmission power, means for scheduling one or more other uplink (UL) transmissions to avoid interference with a transmission from the UE for reception by the base station, and means for receiving the transmission from the UE transmitted at the increased transmission power after the transmission is reflected off at least one object within a distance of the UE in response to transmitting the increase transmission power message.

In one aspect, the aforementioned means for transmitting an increase transmission power message to a user equipment (UE) for the UE to transmit a transmission at an increased transmission power, means for scheduling one or more other uplink (UL) transmissions to avoid interference with a transmission from the UE for reception by the base station, and means for receiving the transmission from the UE transmitted at the increased transmission power after the transmission is reflected off at least one object within a distance of the UE in response to transmitting the increase transmission power message may be the processor(s) 1004 shown in FIG. 10 configured to perform the functions recited by the aforementioned means. For example, the aforementioned means for transmitting an increase transmission power message to a user equipment (UE) for the UE to transmit a transmission at an increased transmission power may include the transmitting circuitry 1040 and transceiver 1010 shown in FIG. 10. As another example, the aforementioned means for scheduling one or more other uplink (UL) transmissions to avoid interference with a transmission from the UE for reception by the base station may include the scheduling circuitry 1042 shown in FIG. 10. As yet another example, the aforementioned means for receiving the transmission from the UE transmitted at the increased transmission power after the transmission is reflected off at least one object within a distance of the UE in response to transmitting the increase transmission power message may include the receiving circuitry 1044 and the transceiver 1010 shown in FIG. 10. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 7A, 7B, 8, 9, 10 and 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication performed by a user equipment (UE), comprising:
    transmitting an increase transmission power request message to a base station;
    receiving an increase transmission power acceptance message in response to transmitting the increase transmission power request message;
    sending a transmission using an increased transmission power specified by the increase transmission power acceptance message;
    receiving a reflection of the transmission reflected off at least one object; and
    determining at least one parameter associated with the at least one object based on the reflection of the transmission reflected off the at least one object.

2. The method of claim 1, wherein the at least one parameter comprises at least one of a position of the at least one object, a velocity of the at least one object, a rotation of the at least one object, or a direction of movement of the at least one object.

3. The method of claim 1, wherein the transmission comprises at least one of a null transmission or a data transmission.

4. The method of claim 1, wherein the transmission comprises a sounding reference signal (SRS).

5. The method of claim 1, wherein the increase transmission power acceptance message comprises at least one of a scheduling downlink control information (DCI) message received via a physical downlink control channel (PDCCH), a MAC-CE message, or a radio resource control (RRC) signal.

6. The method of claim 1, wherein the increased transmission power comprises a transmission power that is greater than a current transmission power control (TPC) state associated with the UE.

7. The method of claim 1, wherein the increase transmission power request message comprises an indication of a requested increase transmission power relative to a current transmission power control (TPC) state associated with the UE.

8. The method of claim 1, wherein the increased transmission power comprises a maximum transmission power associated with the UE.

9. The method of claim 1, wherein the increase transmission power request message comprises at least one of an indication of one or more directions for transmitting the transmission or an indication of a determined bandwidth of the transmission.

10. The method of claim 9, wherein the one or more directions comprise a direction of a location of the at least one object.

11. The method of claim 10, wherein sending the transmission comprises transmitting the transmission towards at least the direction of the location of the at least one object.

12. A user equipment (UE) for wireless communication, comprising:
a transceiver;
a memory; and
a processor communicatively coupled to the transceiver and the memory, wherein the processor is configured to:
transmit, via the transceiver, an increase transmission power request message to a base station,
receive, via the transceiver, an increase transmission power acceptance message after transmission of the increase transmission power request message,
send, via the transceiver, a transmission using an increased transmission power specified by the increase transmission power acceptance message,
receive, via the transceiver, a reflection of the transmission reflected off at least one object, and
determine at least one parameter associated with the at least one object based on the reflection of the transmission reflected off the at least one object.

13. The UE of claim 12, wherein the increase transmission power request message comprises at least one of an indication of one or more directions for transmitting the transmission or an indication of a determined bandwidth of the transmission.

14. The UE of claim 13, wherein the one or more directions comprise a direction of a location of the at least one object.

15. The UE of claim 14, wherein, to send the transmission, the processor is configured to send, via the transceiver, the transmission towards at least the direction of the location of the at least one object.

16. A method of wireless communication performed by a base station, comprising:
receiving an increase transmission power request message from a user equipment (UE);
transmitting an increase transmission power message to configure the UE to transmit a transmission at an increased transmission power;
scheduling one or more uplink (UL) transmissions to avoid interference with the transmission; and
receiving, after transmission of the increase transmission power message, a reflection of the transmission after the transmission is reflected off at least one object.

17. The method of claim 16, wherein the one or more UL transmissions comprise at least one of a frequency division multiplexing (FDM) UL transmission or a multi-user, multiple-input, multiple-output (MU-MIMO) UL transmission.

18. The method of claim 17, wherein scheduling the one or more UL transmissions comprises:
receiving an indication of one or more UL transmissions for reception by one or more other base stations to avoid the interference with the transmission.

19. The method of claim 16, wherein the transmission comprises a beamformed transmission.

20. The method of claim 19, wherein the increase transmission power message comprises an indication of a direction for transmitting the beamformed transmission that coincides with a direction of the at least one object.

21. The method of claim 16, wherein the increased transmission power comprises a transmission power that is greater than a current transmission power control (TPC) state associated with the UE.

22. The method of claim 16, wherein the at least one object is located a position that is not along a direct path between the UE and the base station.

23. A base station for wireless communication, comprising:
a transceiver;
a memory; and
a processor communicatively coupled to the transceiver and the memory, wherein the processor is configured to:
receive, via the transceiver, an increase transmission power request message from a user equipment (UE),
transmit, via the transceiver, an increase transmission power message to configure the UE to transmit a transmission at an increased transmission power,
schedule one or more uplink (UL) transmissions to avoid interference with the transmission, and
receive, via the transceiver after transmission of the increase transmission power message, a reflection of the transmission after the transmission is reflected off at least one object.

24. The base station of claim 23, wherein the one or more UL transmissions comprise at least one of a frequency division multiplexing (FDM) UL transmission or a multi-user, multiple-input, multiple-output (MU-MIMO) UL transmission.

25. The base station of claim 24, wherein, to schedule the one or more UL transmissions, the processor is configured to:
receive an indication of one or more UL transmissions for reception by one or more other base stations to avoid the interference with the transmission.

26. The base station of claim 23, wherein the transmission comprises a beamformed transmission.

27. The base station of claim 26, wherein, the increase transmission power message comprises an indication of a direction for transmitting the beamformed transmission that coincides with a direction of the at least one object.

28. The base station of claim 23, wherein the increased transmission power comprises a transmission power that is greater than a current transmission power control (TPC) state associated with the UE.

29. The base station of claim 23, wherein the at least one object is located a position that is not along a direct path between the UE and the base station.

* * * * *